US012477108B2

(12) United States Patent
Zhang et al.

(10) Patent No.: US 12,477,108 B2
(45) Date of Patent: Nov. 18, 2025

(54) SEPARATE TREE CODING RESTRICTIONS

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Xi Xie, Beijing (CN); Junru Li, Beijing (CN); Meng Wang, Beijing (CN)

(73) Assignees: Beijing Bytedance Network Technology Co., Ltd., Beijing (CN); Bytedance Inc., Los Angeles, CA (US)

( * ) Notice: Subject to any disclaimer, the term of this patent is extended or adjusted under 35 U.S.C. 154(b) by 126 days.

(21) Appl. No.: 18/468,882

(22) Filed: Sep. 18, 2023

(65) Prior Publication Data
US 2024/0007628 A1  Jan. 4, 2024

Related U.S. Application Data

(63) Continuation of application No. PCT/CN2022/081160, filed on Mar. 16, 2022.

(30) Foreign Application Priority Data

Mar. 17, 2021 (WO) ................ PCT/CN2021/081291

(51) Int. Cl.
*H04N 19/119* (2014.01)
*H04N 19/159* (2014.01)
(Continued)

(52) U.S. Cl.
CPC ......... *H04N 19/119* (2014.11); *H04N 19/159* (2014.11); *H04N 19/176* (2014.11);
(Continued)

(58) Field of Classification Search
None
See application file for complete search history.

(56) References Cited

U.S. PATENT DOCUMENTS 9,077,998 B2  7/2015  Wang
9,247,258 B2  1/2016  Coban
(Continued)

FOREIGN PATENT DOCUMENTS

CN    109691102 A    4/2019
WO    2019231751 A1  12/2019
(Continued)

OTHER PUBLICATIONS

Document: JVET-L0191, Laroche, G., et al., "CE3-5.1: On cross-component linear model simplification," Joint Video Experts Team (JVET) of ITU-T SG 16 WP 3 and ISO/IEC JTC 1/SC 29/WG 11 12th Meeting: Macao, CN, Oct. 3-12, 2018, 4 pages.
(Continued)

*Primary Examiner* — Kaitlin A Retallick
(74) *Attorney, Agent, or Firm* — Conley Rose, P.C.; Brandt D. Howell

(57) ABSTRACT

A mechanism for processing video data implemented by a video coding apparatus is disclosed. The mechanism determines usage of one or more of a separate tree coding and a partitioning beyond a minimum size threshold for a video unit. The mechanism also disables a cross-component coding tool for the video unit based on the determination. A conversion between a visual media data and a bitstream is performed in accordance with the coding tool being disabled.

19 Claims, 10 Drawing Sheets

100

Co-located luma reconstruction block    Temporary Chroma Prediction Block    Final Chroma Prediction Block

(51) Int. Cl.
H04N 19/176 (2014.01)
H04N 19/186 (2014.01)
H04N 19/70 (2014.01)
H04N 19/96 (2014.01)

(52) U.S. Cl.
CPC ........... H04N 19/186 (2014.11); H04N 19/70 (2014.11); H04N 19/96 (2014.11)

(56) References Cited

U.S. PATENT DOCUMENTS

| | | | |
|---|---|---|---|
| 9,473,779 | B2 | 10/2016 | Rapaka |
| 9,591,325 | B2 | 3/2017 | Li |
| 9,628,792 | B2 | 4/2017 | Rapaka |
| 9,807,406 | B2 | 10/2017 | Ramasubramonian |
| 10,057,574 | B2 | 8/2018 | Li |
| 10,200,700 | B2 | 2/2019 | Zhang |
| 10,257,539 | B2 | 4/2019 | An |
| 10,321,130 | B2 | 6/2019 | Dong |
| 10,404,999 | B2 | 9/2019 | Liu |
| 10,419,757 | B2 | 9/2019 | Chen |
| 10,469,847 | B2 | 11/2019 | Xiu |
| 10,506,230 | B2 | 12/2019 | Zhang |
| 10,531,111 | B2 | 1/2020 | Li |
| 10,708,592 | B2 | 7/2020 | Dong |
| 10,721,469 | B2 | 7/2020 | Zhang |
| 10,728,573 | B2 | 7/2020 | Sun |
| 10,778,974 | B2 | 9/2020 | Karczewicz |
| 10,855,985 | B2 | 12/2020 | Zhang |
| 10,939,128 | B2 | 3/2021 | Zhang |
| 10,965,941 | B2 | 3/2021 | Zhao |
| 10,979,717 | B2 | 4/2021 | Zhang |
| 2012/0183078 | A1 | 7/2012 | Lai |
| 2017/0238020 | A1 | 8/2017 | Karczewicz |
| 2017/0244975 | A1 | 8/2017 | Huang |
| 2018/0041778 | A1 | 2/2018 | Zhang |
| 2018/0041779 | A1 | 2/2018 | Zhang |
| 2018/0184127 | A1 | 6/2018 | Zhang |
| 2018/0288446 | A1 | 10/2018 | An |
| 2019/0191180 | A1 | 6/2019 | An |
| 2019/0215532 | A1 | 7/2019 | He |
| 2019/0230353 | A1 | 7/2019 | Gadde |
| 2019/0238845 | A1 | 8/2019 | Zhang |
| 2019/0306502 | A1 | 10/2019 | Gadde |
| 2020/0092574 | A1 | 3/2020 | Li |
| 2020/0120359 | A1 | 4/2020 | Hanhart |
| 2020/0236353 | A1 | 7/2020 | Zhang |
| 2020/0252619 | A1 | 8/2020 | Zhang |
| 2020/0260096 | A1* | 8/2020 | Ikai ........................ H04N 19/96 |
| 2020/0260120 | A1 | 8/2020 | Hanhart |
| 2020/0267381 | A1 | 8/2020 | Vanam |
| 2020/0314418 | A1 | 10/2020 | Wang |
| 2020/0322632 | A1 | 10/2020 | Hanhart |
| 2020/0359051 | A1 | 11/2020 | Zhang |
| 2020/0366910 | A1 | 11/2020 | Zhang |
| 2020/0366933 | A1 | 11/2020 | Zhang |
| 2020/0374540 | A1 | 11/2020 | Wang |
| 2020/0382769 | A1 | 12/2020 | Zhang |
| 2020/0413038 | A1 | 12/2020 | Zhang |
| 2021/0021825 | A1 | 1/2021 | Zheng |
| 2021/0076034 | A1 | 3/2021 | Misra |
| 2021/0092395 | A1 | 3/2021 | Zhang |
| 2021/0092396 | A1 | 3/2021 | Zhang |
| 2021/0152837 | A1 | 5/2021 | Zhang |
| 2021/0160513 | A1 | 5/2021 | Hu |
| 2021/0185353 | A1 | 6/2021 | Xiu |
| 2021/0211662 | A1 | 7/2021 | Wang |
| 2021/0211681 | A1 | 7/2021 | Zhang |
| 2021/0235109 | A1 | 7/2021 | Liu |
| 2021/0243435 | A1 | 8/2021 | Zhang |
| 2021/0250649 | A1 | 8/2021 | Zhang |
| 2021/0258571 | A1 | 8/2021 | Zhang |
| 2021/0258572 | A1 | 8/2021 | Zhang |
| 2021/0297694 | A1 | 9/2021 | Zhang |
| 2021/0314595 | A1 | 10/2021 | Zhang |
| 2021/0314628 | A1 | 10/2021 | Zhang |
| 2021/0321095 | A1 | 10/2021 | Zhang |
| 2021/0321121 | A1 | 10/2021 | Zhang |
| 2021/0321131 | A1* | 10/2021 | Zhang .................. H04N 19/184 |
| 2021/0337228 | A1 | 10/2021 | Wang |
| 2021/0337239 | A1 | 10/2021 | Zhang |
| 2021/0344902 | A1 | 11/2021 | Zhang |
| 2021/0368171 | A1 | 11/2021 | Zhang |
| 2021/0377524 | A1 | 12/2021 | Zhang |
| 2021/0385446 | A1 | 12/2021 | Liu |
| 2021/0392381 | A1 | 12/2021 | Wang |
| 2021/0400260 | A1 | 12/2021 | Zhang |
| 2021/0409703 | A1 | 12/2021 | Wang |
| 2022/0007014 | A1 | 1/2022 | Wang |
| 2022/0086493 | A1* | 3/2022 | Francois ................ H04N 19/70 |
| 2022/0201321 | A1* | 6/2022 | Gao ..................... H04N 19/157 |
| 2022/0286674 | A1* | 9/2022 | Wang .................. H04N 19/117 |
| 2022/0345698 | A1 | 10/2022 | Misra |

FOREIGN PATENT DOCUMENTS

| | | |
|---|---|---|
| WO | 2020143825 A1 | 7/2020 |
| WO | 2020176459 A1 | 9/2020 |

OTHER PUBLICATIONS

Document: JVET-P0106-v2, Kotra, A., et al., "AHG16/CE5-Related: Simplifications for Cross Component Adaptive loop filter," Joint Video Experts Team (JVET) of ITU-T SG 16 WP 3 and ISO/IEC JTC 1/SC 29/WG 11 16th Meeting: Geneva, CH, Oct. 1-11, 2019, 18 pages.

Document: JVET-P0173-v2, Jingya, L., et al., "AHG16/Non-CE5: Cross component ALF simplification," Joint Video Experts Team (JVET) of ITU-T SG 16 WP 3 and ISO/IEC JTC 1/SC 29/WG 11 16th Meeting: Geneva, CH, Oct. 1-11, 2019, 9 pages.

Document: JVET-P0251-v4, Zhao, Y., et al., "CE5-related: Simplified CCALF with 6 filter coefficients," Joint Video Experts Team (JVET) of ITU-T SG 16 WP 3 and ISO/IEC JTC 1/SC 29/WG 11 16th Meeting: Geneva, CH, Oct. 1-11, 2019, 11 pages.

Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.
Retrieved by the internet: https://vcgit.hhi.fraunhofer.de/jvet/VVCSoftware_VTM/-/tags/VTM-7.0, May 14, 2025, 1 page.

Document: JVET-M0057, Abdoli, M., et al., "CE8: BDPCM with horizontal/vertical predictor and independently decodable areas (test 8.3.1b)," Joint Video Experts Team (JVET) of ITU-T SG 16 WP 3 and ISO/IEC JTC 1/SC 29/WG 11 13th Meeting: Marrakech, MA, Jan. 9-18, 2019, 7 pages.

Document: JVET-N0413, Karczewics, M., et al., "CE8-related: Quantized residual BDPCM," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.

Document: JVET-P0080, Misra, K., et al., "CE5-2.1, CE5-2.2: Cross Component Adaptive Loop Filter," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.

Document: JVET-P1008-v2, Misra, K., et al., "CE5-related: On the design of CC-ALF," Joint Video Experts Team (JVET) of ITU-T SG 16 WP 3 and ISO/IEC JTC 1/SC 29/WG 11 16th Meeting: Geneva, CH, Oct. 1-11, 2019, 6 pages.

Document: JVET-O0636_r1, Misra, K., et al., "Cross-Component Adaptive Loop Filter for chroma," Joint Video Experts Team (JVET) of ITU-T SG 16 WP 3 and ISO/IEC JTC 1/SC 29/WG 11 15th Meeting: Gothenburg, SE, Jul. 3-12, 2019, 9 pages.

Document: JVET-P2025-v4, Chen, C-Y., et al., "Description of Core Experiment 5 (CE5): Cross Component Adaptative Loop Filtering," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.

Document: JVET-Q0311-v2, Wang, Y., et al., "Non-CE5: On CC-ALF padding for ALF virtual boundaries," Joint Video Experts

(56) References Cited

OTHER PUBLICATIONS

Team (JVET) of ITU-T SG 16 WP 3 and ISO/IEC JTC 1/SC 29/WG 11 17th Meeting: Brussels, BE, Jan. 7-17, 2020, 6 pages.
Document: JVET-N0088-v1, Chen, C-Y., et al., "CE5-1: Adaptive loop filter with virtual boundary processing," Joint Video Experts Team (JVET) of ITU-T SG 16 WP 3 and ISO/IEC JTC 1/SC 29/WG 11 14th Meeting: Geneva, CH, Mar. 19-27, 2019, 8 pages.
Non-Final Office Action from U.S. Appl. No. 17/824,386 dated Feb. 1, 2024, 23 pages.

* cited by examiner

100

Co-located luma reconstruction block    Temporary Chroma Prediction Block    Final Chroma Prediction Block

200

Example Neighboring Samples

SEPARATE TREE CODING RESTRICTIONS

CROSS-REFERENCE TO RELATED APPLICATIONS

This patent application is a continuation of International Patent Application No. PCT/CN2022/081160, filed on Mar. 16, 2022, which claims the priority to and benefits of International Application No. PCT/CN2021/081291, filed on Mar. 17, 2021. All the aforementioned patent applications are hereby incorporated by reference in their entireties.

TECHNICAL FIELD

This patent document relates to encoding, transcoding, and decoding of digital media information including images and video.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data implemented by a video coding apparatus, comprising: making a determination that one or more of a separate tree coding and a partitioning beyond a minimum size threshold is used for a video unit; disabling a cross-component coding tool for the video unit based on the determination; and performing a conversion between a visual media data and a bitstream in accordance with the coding tool being disabled.

Optionally, in any of the preceding aspects, another implementation of the aspect provides that the cross-component coding tool is two-step cross-component prediction mode (TSCPM).

Optionally, in any of the preceding aspects, another implementation of the aspect provides that the cross-component coding tool is at least one of left TSCPM (TSCPM-Left), and above TSCPM (TSCPM-Above).

Optionally, in any of the preceding aspects, another implementation of the aspect provides that the cross-component coding tool is prediction with multiple cross-components (PMC).

Optionally, in any of the preceding aspects, another implementation of the aspect provides disabling the cross-component coding tool for the video unit based on the determination and when the video unit contains a partitioning of a luma block and the luma block contains a dimension at the minimum size threshold.

Optionally, in any of the preceding aspects, another implementation of the aspect provides disabling the cross-component coding tool for the video unit based on the determination and when the video unit contains a partitioning of a luma block, the luma block contains a dimension at the minimum size threshold, and the luma block contains a luma sample coded by a specified mode.

Optionally, in any of the preceding aspects, another implementation of the aspect provides that the minimum size threshold is a width of four or a height of four.

Optionally, in any of the preceding aspects, another implementation of the aspect provides that the minimum size threshold is a width of eight or a height of sixteen when the partitioning is horizontal extended quad tree (EQT).

Optionally, in any of the preceding aspects, another implementation of the aspect provides that the minimum size threshold is a width of sixteen or a height of eight when the partitioning is vertical EQT.

Optionally, in any of the preceding aspects, another implementation of the aspect provides that the minimum size threshold is a width of eight or a height of eight when the partitioning is quad tree (QT).

Optionally, in any of the preceding aspects, another implementation of the aspect provides that the minimum size threshold is a width of eight when the partitioning is vertical binary tree (BT).

Optionally, in any of the preceding aspects, another implementation of the aspect provides that the minimum size threshold is a height of eight when the partitioning is horizontal BT.

Optionally, in any of the preceding aspects, another implementation of the aspect provides that the minimum size threshold is an area of 32×16 when the partitioning is horizontal EQT.

Optionally, in any of the preceding aspects, another implementation of the aspect provides that the minimum size threshold is an area of 16×32 when the partitioning is vertical EQT.

Optionally, in any of the preceding aspects, another implementation of the aspect provides that the cross-component coding tool is disabled for a chroma block in a separate tree region of the video unit when the video unit is coded by the separate tree coding and when a luma block in the separate tree region of the video unit is coded with the specified mode.

Optionally, in any of the preceding aspects, another implementation of the aspect provides that the specified mode is inter-coding mode, intra block copy (IBC) mode, string copy mode, intra sub-partitioning (ISP) mode, or combinations thereof.

Optionally, in any of the preceding aspects, another implementation of the aspect provides that a codeword representing the cross-component coding tool is omitted from the bitstream when the cross-component coding tool is disabled.

Optionally, in any of the preceding aspects, another implementation of the aspect provides that the conversion is further performed in accordance with coding information for the video unit, a sequence parameter set (SPS), a sequence header, a picture parameter set (PPS), a picture header, a slice header, a coding tree unit (CTU), a coding unit (CU), color format information, standard level, profiles, or combinations thereof.

A second aspect relates to a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A third aspect relates to an apparatus for processing video data comprising: a processor; and a non-transitory memory with instructions thereon, wherein the instructions upon execution by the processor, cause the processor to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

This document is related to image/video coding, and more particularly to cross-component prediction. The disclosed mechanisms may be applied to the video coding standards such as High Efficiency Video Coding (HEVC), Versatile Video Coding (VVC), and/or third generation Audio Video Standard (AVS3). Such mechanisms may also be applicable to other video coding standards and/or video codecs.

AVS3, employs tools that rely on the decoded information of other color components when coding a current color component. Such tools may include the Two-Step Cross-component Prediction Mode (TSCPM) and the Prediction with Multiple Cross-Components (PMC). More details about the two coding tools are disclosed below. TSCPM in AVS3 is now discussed.

Figure 1:
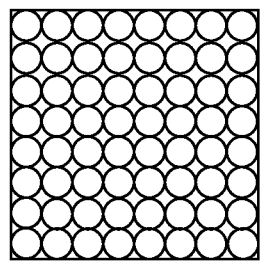
FIG. 1 is a schematic diagram of a coding flow for Two-Step Cross-component Prediction Mode (TSCPM).
Figure 1:
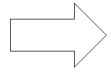
Figure 1:
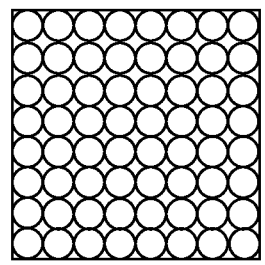
Figure 1:
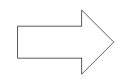
Figure 1:
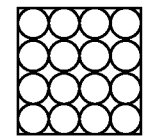

FIG. 1 is a schematic diagram 100 of a coding flow for TSCPM. TSCPM is performed via the following steps. A video coding device first decodes and reconstructs luma samples for a current block. A linear model for the current block is obtained from neighboring reconstructed samples. The linear model is then applied to the reconstructed luma block to obtain an internal prediction resulting in a temporary chroma prediction block. The internal prediction/temporary chroma prediction block is then down-sampled to generate the final chroma prediction block. Schematic diagram 100 depicts the basic procedures of the chroma prediction block generation process. The left square denotes the originally reconstructed luma (RL) sample located at (x, y) of the collocated luma block by RL(x, y). By applying a linear model with parameters ($\alpha$, $\beta$) to each luma sample, a temporary chroma prediction block is generated. A sample in the temporary chroma prediction block is denoted by $P'_c(x,y)=\alpha*R\_L(x,y)+\beta$. The temporary chroma prediction block is then further down-sampled to generate the final chroma prediction block. A sample in the final chroma prediction block is denoted by $P_c(x,y)$. The linear model derivation process and down-sampling process is described in the following sub-sections.

Accordingly, TSCPM operates by encoding chroma components based on luma components. Luma components in a block are encoded according to inter and/or intra prediction. The chroma components are then encoded by prediction based on the luma components. At a decoder, this process is inverted by decoding the luma components via inter and/or intra prediction. The chroma components are then predicted based on the luma components and downsampled to achieve the decoded chroma components. The prediction of the chroma components is performed based on a linear model determined based on neighboring samples outside the current block. A mechanism for selecting the neighboring samples to support determination of the linear model is discussed below.

Figure 2:
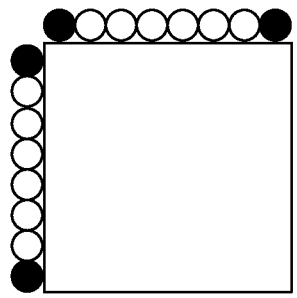
FIG. 2 is a schematic diagram of example neighbor sample selection when the left and the above reference samples are available.

FIG. 2 is a schematic diagram 200 of example neighbor sample selection when the left and the above reference samples are available. The selected neighbor samples are depicted as black circles and the unselected neighbor samples are depicted as white circles. The current block is depicted as the square.

A mechanism for deriving the linear model is now discussed. In an example, either two or four samples may be selected and averages of two larger values and two smaller values are utilized to calculate the parameters for the linear model. Selection of the neighboring samples is now discussed. First, a ratio r of width and height of the chroma coded block is calculated. Then, based on the availability of above row and left column, the two or four samples are selected, for example according to Equation 1.

$$r = \begin{cases} \frac{width}{height} & \text{if width} \geq \text{height} \\ \frac{height}{width} & \text{if width} < \text{height} \end{cases} \quad (1)$$

Accordingly, if the above and the left neighboring reference samples are both available, four samples located at [0, −1], [width−max(1, r), −1], [−1, 0], and [−1, height−max(1, r)] are selected as shown in schematic diagram 200. When only the above neighboring reference samples are available, four samples located at [0, −1], [width/4, −1], [2width/4, −1], [3width/4, −1] are selected. For the case that only left reference samples are accessible, the four samples located at [−1, 0], [−1, height/4], [−1, 2height/4], [−1, 3height/4] are employed. It should be noted that neighboring samples are available when the current block is adjacent to a block that contains samples at the corresponding locations. For example, when a block is positioned near an edge of an image, there may be not available adjacent block on the other side of the edge. Hence, neighboring samples are not available in such a case. For example, when a current block is positioned at the top edge of a picture, the above neighboring row is not available. Further, when a current block is position at the left edge of a picture, the left neighboring column is not available.

Subsequently, the four samples are sorted according to luma sample intensity and classified into two groups. The two larger samples and two smaller samples are respectively averaged. A cross-component prediction model is derived with the two averaged points as discussed in greater detail below. In one example, an α, β, and a shift may be derived based on the average of two larger selected sample values as (MaxLuma, MaxChroma) and based on the average of two smaller selected sample values as (MinLuma, MinChroma) as described in detail below.

If only either an above block with a current chroma block width up to two or a left block with a current chroma block height up to two is available, then [0, −1] and [1, −1] of the above line or [−1, 0], [−1, 1] of the left line, respectively, are selected. A chroma prediction model is derived according to the luminance and chrominance values of the two selected samples. If neither the left block nor the above block is available, a default prediction is used with α equal to 0 and β equal to 1<<(BitDepth−1), where BitDepth represents the bit-depth of chroma samples.

An example two step derivation process of chroma prediction block is now discussed. A temporary chroma prediction block is generated with Equation 2, where P'$_c$(x, y) denotes a temporary prediction block, a and are model parameters, and R L (x, y) is a reconstructed luma sample.

$$P'_c(x,y)=\alpha \times R_L(x,y)+\beta \quad (2)$$

Clipping operations are applied to P'$_c$(x, y) to make sure it is within [0, 1<<(BitDepth−1)]. Such a clipping process is similar to the clipping process used in other intra prediction processes. A six-tap filter (e.g., [1 2 1; 1 2 1]) is employed for the down-sampling process for the temporary chroma prediction block, as shown in Equation.3.

$$P_c=(2\times P'_c(2x,2y)+2\times P_c'(2x,2y+1)+P'_c(2x-1,2y)+P_c'(2x+1,2y)+P'_c(2x-1,2y+1)+P_c'(2x+1,2y-1)+\text{offset0})>>3 \quad (3)$$

In addition, for chroma samples located at the left most column, a [1 1] downsampling filter may be applied instead as shown in Equation 4.

$$P_c=(P'_c(2x,2y)+P_c'(2x+1,2y)+\text{offset1})>>1 \quad (4)$$

The two variables offset0 and offset1 are integer values. In some examples, the varaiables offset0 and offset1 may be set to four, and one, respectively. In some examples, offset0 and offset1 may be set to zero.

Additional TSCPM modes are now discussed. In addition to the TSCPM mode described above (denoted by TSCPM-LT), two additional TSCPM modes are also described. For example, TSCPM can utilize only left neighboring samples (TSCPM-L) or TSCPM can utilize above neighboring samples (TSCPM-A).

Example syntax design is also discussed. Based on the AVS3 specification, a flag can be used to signal whether the chroma intra-predication mode is TSCPM or not. This flag (as a 2nd bin) is coded after the indication of luminance derrived mode (DM) mode usage (1st bin).

Figure 3:
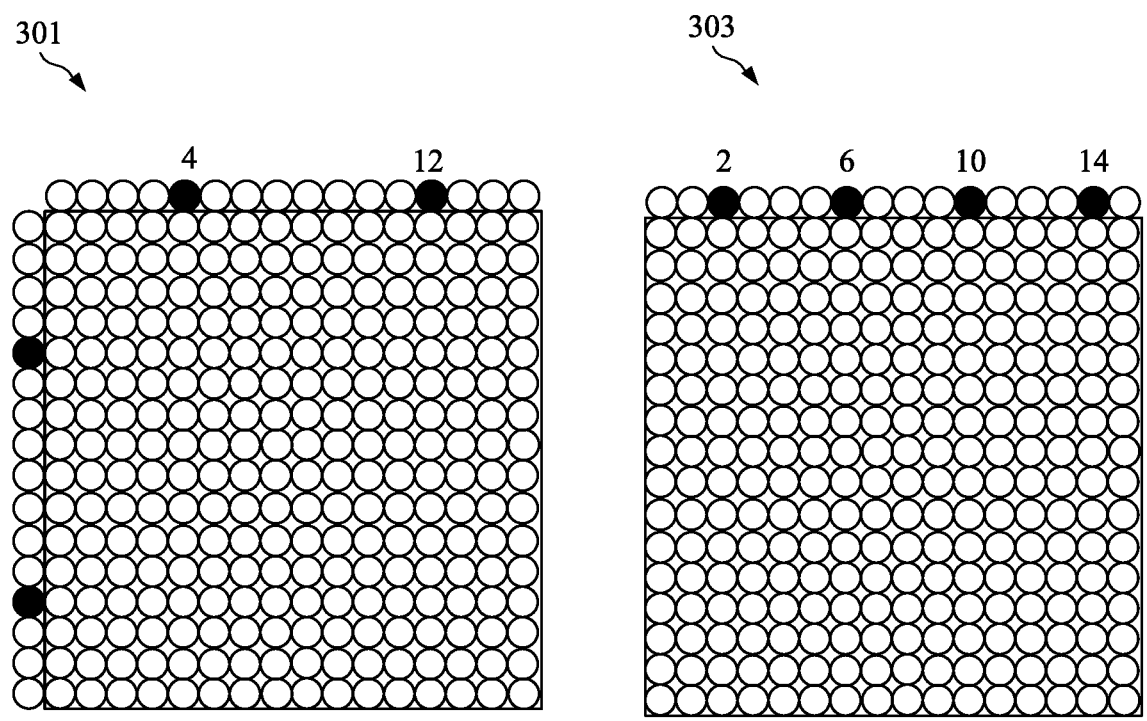
FIG. 3 is a schematic diagram of example four-point based linear model derivation sample selection.

FIG. 3 is a schematic diagram of example four-point based linear model derivation sample selection. Block 301 is a block with selected neighboring samples for linear model derivation when both above and left neighboring samples are available. Block 303 is a block with selected neighboring samples for linear model derivation when only the above neighboring samples are available and the left neighboring samples are not available. The selected neighboring samples are depicted as block circles and the unselected neighboring samples are depicted as white circles. The blocks may include chroma samples that are predicted based on the selected neighboring samples using a linear model, for example according to TSCPM as discussed above.

A four-point based linear model derivation is now discussed. The four-point based linear model derivation may be employed to determine linear model parameters a, (3, and/or shift for use in TSCPM. As noted above, either two points or four points of neighboring luma samples and corresponding chroma samples are utilized to derive the linear model parameters. According to the color format, the luma samples may be downsampled luma samples instead of the reconstructed luma samples in some examples.

In an example, the two or four points are selected with equal distance. The current chroma block may have a width (W) and a height (H). In an example, the CCLM parameters (α and β) are derived with at most four neighboring chroma samples and their corresponding down-sampled luma samples. Suppose the current chroma block dimensions are W×H, then W″ and H' are set as:

W'=W, H'=H when linear model (LM) mode is applied;
W'=W+H when LM type A (LM-A) mode is applied; and
H'=H+W when LM type L (LM-L) mode is applied.

In an example, the top-left coordinate of the current chroma block is [0, 0]. If the above and the left blocks are both available and the current mode is the LM mode (excluding LM type T (LM-T), and LM-L), two chroma samples located in the above row and two chroma samples located in the left column are selected. In this case, the two above samples' coordinates are [floor(W/4), −1] and [floor(3*W/4), −1], and the two left samples' coordinates are [−1, floor(H/4)] and [−1, floor (3*H/4)] as shown in block 301. Subsequently, the four samples are sorted according to luma sample intensity and classified into two groups. The two larger samples and two smaller samples, respectively, are averaged. A cross component prediction model is derived with the two averaged points. In an alternate example, the maximum and minimum value of the four samples are used to derive the LM parameters.

When the above block is available while the left block is not available, four chroma samples from the above block are selected when W>2 and two chroma samples are selected when W=2. The four selected above samples' coordinates are [W/8, −1], [W/8+W/4, −1], [W/8+2*W/4, −1], and [W/8+3*W/4, −1], as shown in block 303. When the left block is available while the above block is not available, four chroma samples from the left block are selected when H>2 and two chroma samples are selected when H=2. The four selected left samples' coordinates are [−1, H/8], [−1, H/8+H/4], [−1, H/8+2*H/4, −1], and [−1, H/8+3*H/4]. When neither of the left and above blocks are available, a default prediction is used. For example, α equals 0 and β equals to 1<<(BitDepth-1), where BitDepth represents the bit-depth of chroma samples.

When the current mode is LM-T mode, four chroma samples from the above block are selected when W'>2 and two chroma samples are selected when W'=2. W' is the available number of above neighboring samples, which can be 2*W. In this case, the four selected above samples' coordinates are [W'/8, −1], [W'/8+W'/4, −1], [W'/8+2*W'/4, −1], and [W'/8+3*W'/4, −1]. When the current mode is LM-L mode, four chroma samples from the left block are selected when H'>2 and two chroma samples are selected when H'=2. H' is the available number of left neighboring samples, which can be 2*H. In this case, the four selected left samples' coordinates are [−1, H'/8], [−1, H'/8+H'/4], [−1, H'/8+2*H'/4, −1], and [−1, H'/8+3*H'/4].

Figure 4:
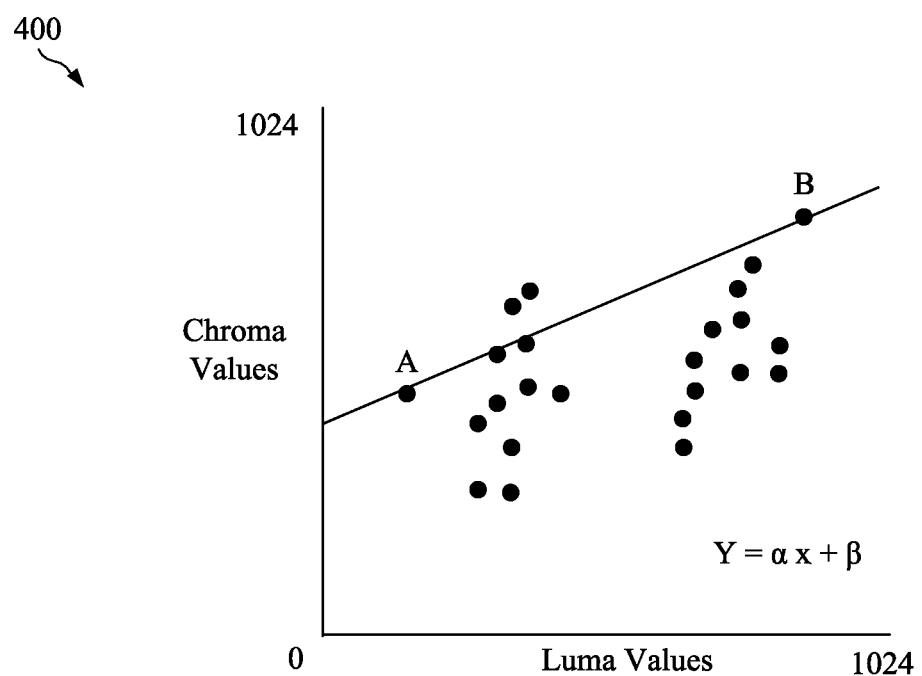
FIG. 4 is a graph illustrating an example straight line between minimum and maximum luma values, which can be used to determine linear mode parameters.

FIG. 4 is a graph 400 illustrating an example straight line between minimum and maximum luma values, which can be used to determine linear mode parameters. Some systems replace the least mean squares (LMS) algorithm of the linear model parameters a and by a straight-line equation, which may be referred to as a two-point method. The two smaller values among the four points are averaged, and denoted as A. The greater two values (the remaining two) among the four points are averaged, and denoted by B. An example of A and B are depicted in graph 400.

The linear model parameters α and β can be obtained according to the following equations:

$$a = \frac{(y_B - y_A)}{(x_B - x_A)} \quad (5)$$

$$\beta = y_A - \alpha * x_A \quad (6)$$

The division to derive α is avoided and replaced multiplications and shifts as below. When either the above block or the left neighboring block is available, the following applies:

```
a = 0;
iShift = 16;
shift = (InternalBitDepth > 8) ? InternalBitDepth − 9 : 0;
add = shift ? 1 << (shift − 1) : 0;
diff = (MaxLuma − MinLuma + add) >> shift;
if (diff > 0)
  {
  div = ((MaxChroma− MinChroma) * g_aiLMDivTableLow[diff − 1] + 32768) >> 16;
  a = (((MaxChroma− MinChroma) * g_aiLMDivTableHigh[diff − 1] + div + add) >> shift);
  }
b = Minchroma − ((a * MinLuma) >> iShift);
```

Otherwise, the following applies:
a=0; iShift=0; b=1<<(BitDepthC−1)
where S is set equal to iShift, α is set equal to a and β is set equal to b, and g_aiLMDivTableLow and g_aiLMDivTableHigh are two tables each with 512 entries. Each entry may store a 16-bit integer.

To derive the chroma predictor, for example in the virtual test model (VTM) implementation, the multiplication is replaced by an integer operation as follows:

$$pred_C(i,j) = (\alpha \cdot rec_L{}^{(i,j)}) >> S + \beta$$

The prediction values are further clipped to the allowed range of chroma values.

Figure 5:
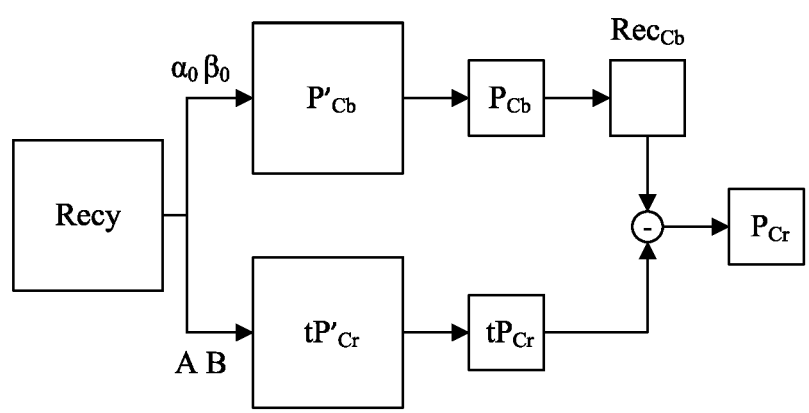
FIG. 5 is a schematic diagram of an example workflow for prediction with multiple cross-components (PMC).

FIG. 5 is a schematic diagram 500 of an example workflow for prediction with multiple cross-components (PMC) used in AVS3. PMC is done in the following steps, as shown in diagram 500. PMC inherits and reorganizes the linear model parameters from TSCPM. The linear model is applied to the originally reconstructed luma block to get an internal blue difference chroma (Cb) and red difference (Cr) prediction block. The internal Cb prediction block is down-sampled to generate the final Cb prediction block. The Cb coding block is reconstructed. The internal Cr prediction block is down-sampled to generate the temporary Cr prediction block. The reconstructed Cb coding block is subtracted from the temporary Cr prediction block to generate the final Cb prediction block. With PMC, the Cb is predicted with the same process as in TSCPM mode:

$$P'_{cb}(x,y) = \alpha_{cb} \times R_L(x,y) + \beta_{cb}, \quad (7)$$

The prediction of Cr should wait for the completion of the Cb reconstruction. More specifically, an internal Cr is first derived as:

$$tP'_{cr}(x,y) = A \times R_L(x,y) + B, \quad (8)$$

where the parameters A and B are derived as follows:

$$A = k \cdot \alpha_{cb} + \alpha_{cr}, \quad (9)$$

$$B = k \cdot \beta_{cb} + \beta_{cr}, \quad (10)$$

($\alpha_{cb}$, $\beta_{cb}$) and ($\alpha_{cr}$, $\beta_{cr}$) are the two sets of linear model parameters derived for Cb and Cr in TSCPM. Subsequently, downsampling is applied to the P'$_{cb}$(x, y) and tP'$_{cr}$(x, y), generating P$_{cb}$(x, y) and tP$_{cr}$(x,y). The downsampling filter is the same used in TSCPM. The prediction of the Cr coding block is derived as follows:

$$P_{cr}(x,y) = tP_{cr}(x,y) - Rec_{cb}(x,y) \cdot k, \quad (11)$$

where Rec$_{cb}$ is the reconstructed block of the Cb component. k equals to 1 when corresponding to the default PMC model. k equals to 0.5 and 2 when corresponding to enhanced PMC models, so as to fit different content. For each picture, only one model is added, such that a picture level flag is signaled. When the flag value is one, the enhanced PMC models (with k equaling to 0.5 and 2) are used for the current picture. At the block level, another block level flag can be signaled to indicate which model is used for the current block. Analogously, when the flag value is zero, the default PMC model (with k equaling to 1) is employed by the current picture.

Separate trees in AVS3 are now discussed. Generally, luma and chroma components share the same partitioning structure. In AVS3, the smallest lumalchroma block size is 4×4. When the size of luma coding block is eight, the associated chroma block size is four for 4:2:0 color format, such that the splitting of chroma is not applicable. A separate tree can be adopted in AVS3 where the coding structure of luma and chroma are locally separated on small coding units. For example, for the case that one side of the luma coding block is no larger than eight, the size of the associated chroma coding block is no larger than four. In such scenario, a separate tree is applied where the luma coding block may be further split, yielding multiple sub-coding blocks. The associated chroma coding block may not be split, and is coded as one chroma coding block.

Figure 6:
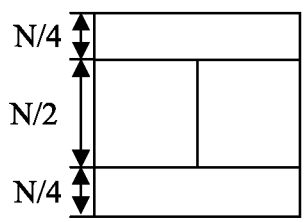
FIG. 6 is a schematic diagram of example extended quad tree (EQT) partitions.
Figure 6:
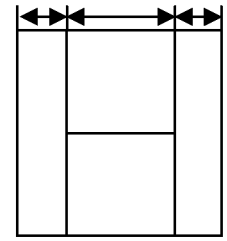

FIG. 6 is a schematic diagram 600 of example EQT partitions in AVS3. As shown, a sub-block can have a height (N) and a width (M). When performing a horizontal EQT split, the coding unit is split horizontally into N/4, N/2, and N/4, and the N/2 portion is split vertically into equal sub-coding units. When performing a vertical EQT split, the coding unit is split vertically into M/4, M/2, and M/4, and the M/2 portion is split horizontally into equal sub-coding units. Accordingly, EQT splits a coding unit into four sub-CUs, where the size and the shape of the sub-CUs are not the same. The splitting pattern of EQT is shown in diagram 600.

Figure 7:
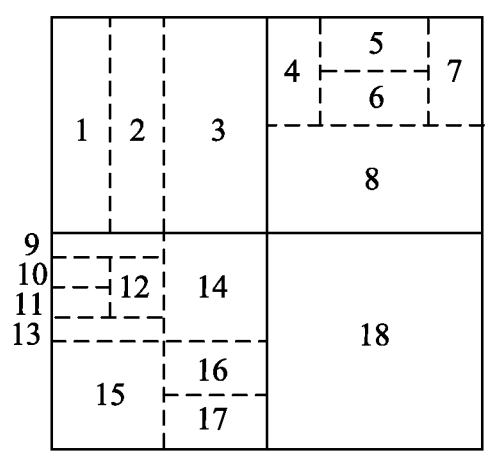
FIG. 7 is a schematic diagram of an example tree structure for employing quad tree (QT), binary tree (BT), and EQT.
Figure 7:
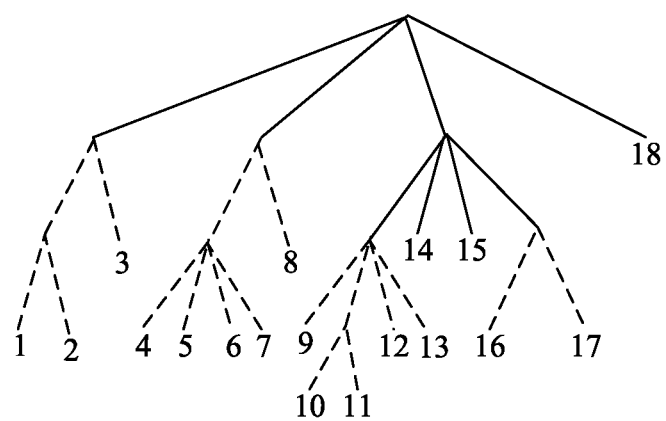

FIG. 7 is a schematic diagram 700 of an example tree structure for employing quad tree (QT), binary tree (BT), and EQT. EQT and BT partitioning can be applied on the leaf nodes of QT. Further, EQT partitioning maybe interleaved with binary-tree partitioning as shown in diagram 700. The numbers shown in schematic diagram 700 indicate a correspondence between the tree structure partitions and the blocks created by such partitions.

The following are example technical problems solved by disclosed technical solutions. There are several problems in AVS3, especially when a separate tree is applied. When at least one block in a separate tree region is coded by a non-intra mode, such as inter/intra block copy, TSCPM may introduce a dependency of chroma intra-coding and luma inter-coding, which is undesirable in hardware design.

Disclosed herein are mechanisms to address one or more of the problems listed above. For example, cross-component coding tools, such as TSCPM and/or PMC, may cause the chroma block to be coded based on the luma block. This may cause errors and/or parallelization inefficiencies when separate coding trees are applied to the luma block and the chroma block. This may also cause errors and/or inefficiencies when certain partition types are applied to smaller luma blocks. Accordingly, the present disclosure disables one or more cross-component coding tools for a video unit when a separate tree coding is employed and/or when partitioning of the video unit applied to a luma block of the video unit is smaller than a minimum size threshold. The minimum size threshold may vary based on the partition used. Such partitions may include horizontal and vertical splits for extended quad tree (EQT), quad tree (QT), binary tree (BT), triple tree (TT), and/or combinations thereof. In some examples, the coding tool is disabled when the luma block is coded by a specified mode, such as inter-coding mode, intra block copy (IBC) mode, string copy mode, intra sub-partitioning (ISP) mode, or combinations thereof. In some examples, the coding tool is disabled for a chroma block in a separate tree region when the specified coding mode is applied to a luma block in the same separate tree region. In some examples, a codeword for the cross-component coding tool is omitted from the bitstream when the cross-component coding tool is disabled. The decoder can infer the cross-component coding tool is disabled based on the lack of the codeword for the cross-component coding tool in the bitstream. In some examples, different cross-component coding tools may be disabled based on different conditions.

The detailed embodiments below should be considered as examples to explain general concepts. These embodiments should not be interpreted in a narrow way. Furthermore, these embodiments can be combined in any manner. In the following discussion, a video unit may be a sequence/ picture/slice/sub-picture/coding tree unit (CTU)/coding unit (CU)/prediction unit (PU)/transform unit (TU)/prediction block (PB)/coding block (CB)/transform block (TB)/a region within one slice or picture. A separate tree region may refer to a region to which a separate tree is applied when a different partition tree structure is applied to luma block and a corresponding chroma block. For example, in AVS-3, a separate tree region may include a luma region with size no greater than M×N (e.g., M=64, N=16) or is smaller than M×N, which is further split with EQT and the luma block's corresponding chroma region.

Example 1

In one example, whether to apply a cross-component coding tool, such as TSCPM TSCPM-Left (a TSCPM mode only using left neighboring samples), TSCPM-Above (a TSCPM mode only using above neighboring samples) or PMC, may follow a rule, which may depend on the usage of a separate tree coding structure, or depend on the usage of EQT and block dimension.

Example 2

In one example, the cross-component coding tool may be disabled for a video unit if separate tree coding is used for the video unit.

Example 3

In one example, the cross-component coding tool may be disabled for a video unit if the dimension of the luma block of the video unit satisfies certain conditions and the luma block is further split using at least one EQT. In one example, the dimension of at least one child/sub block in the luma block unit is equal to W*H (e.g., W=4 or H=4), and/or at least one partitioning (e.g., TT or EQT or BT or QT) is applied. In one example, the dimension of the luma block of the video unit is equal to W*H (e.g., W=8 or H=16), and/or horizontal EQT is applied. In one example, the dimension of the luma block of the video unit is equal to W*H (e.g., W=16 or H=8), and/or vertical EQT is applied. In one example, the dimension of the luma block of the video unit is equal to W*H (e.g., W=8), and/or QT is applied. In one example, the dimension of the luma block of the video unit is equal to W*H (e.g., W=8), and/or vertical BT is applied. In one example, the dimension of the luma block of the video unit is equal to W*H (e.g., H=8), and/or horizontal BT is applied. In one example, the dimension of the luma block of the video unit is equal to 32×16, and/or horizontal EQT is applied. In one example, the dimension of the luma block of the video unit is equal to 16×32, and/or vertical EQT is applied. The dimension (Width*Height) of a block is equal to W*H may refer to that Width is equal to W and/or Height is equal to H. In the above bullets, "equal to" may be replaced by "larger than" or "smaller than" or "no larger than" or "no smaller than".

Example 4

In one example, a cross-component coding tool may be disabled for a video unit if the dimension of the luma block of the video unit satisfies certain conditions and the luma block is further split using at least one of QT, BT, or EQT, and the luma block contains at least one luma sample coded with mode X. In one example, the dimension of any child/ sub block in luma block unit is equal to W*H (e.g., W=4 or H=4), and/or at least one partitioning (e.g., TT or EQT or BT or QT) is applied, and/or the video unit contains at least one luma sample coded with mode X. In one example, the dimension of the luma block of the video unit is equal to W*H (e.g., W=8 or H=16), and/or horizontal EQT is applied, and/or the video unit contains at least one luma sample coded with mode X. In one example, the dimension of the luma block of the video unit is equal to W*H (e.g., W=16 or H=8), and/or vertical EQT is applied, and/or the video unit contains at least one luma sample coded with mode X. In one example, the dimension of the luma block of the video unit is equal to W*H (e.g., W=8), and/or QT is applied, and/or the video unit contains at least one luma sample coded with mode X. In one example, the dimension of the luma block of the video unit is equal to W*H (e.g., W=8), and/or vertical BT is applied, and/or the video unit contains at least one luma sample coded with mode X. In one example, the dimension of the luma block of the video unit is equal to W*H (e.g., H=8), and/or horizontal BT is applied, and/or the video unit contains at least one luma sample coded with mode X. In one example, the dimension of the luma block of the video unit is equal to 32×16, and/or horizontal EQT is applied, and/or the video unit contains at least one luma sample coded with mode X. In one example, the dimension of the luma block of the video unit is equal to 16×32, and/or vertical EQT is applied, and/or the video unit contains at least one luma sample coded with mode X. The dimension (Width*Height) of a block is equal to W*H may refer to that Width is equal to W and/or Height is equal to H. In the above bullets, "equal to" may be replaced by "larger than" or "smaller than" or "no larger than" or "no smaller than".

Example 5

In one example, if separate tree coding is used, and at least one luma block in a first separate tree region is coded with mode X, then the cross-component coding tool may be disabled for a first chroma block which is also in the first separate tree region.

Example 6

In one example, the mode X may be as follows. In one example, mode X may be any mode excluding intra-coding mode. In one example, X may be inter-coding mode. In one example, X may be IBC mode. In one example, X may be string copy mode, also known as string prediction mode. In one example, X may be Intra Sub-Partitioning (ISP) mode. In one example, X may be one of any modes including inter, IBC, string copy, ISP mode, or combinations thereof.

Example 7

In one example, the method may be applied to a first cross-component coding tool but not be applied to a second cross-component coding tool. The first and/or second cross-component coding tool may be TSCPM, TSCPM-Left, TSCPM-Above and/or PMC.

Example 8

In one example, whether to signal at least one codeword to represent a cross-component coding tool, such as TSCPM or PMC, may follow a rule, which may depend on the usage of a separate tree coding structure or depend on the usage of EQT and block dimension.

Example 9

In an example, an indication (e.g., a codeword) that represents the cross-component coding tool may be removed or skipped (e.g., from the bitstream) for a video unit if separate tree coding is used for the video unit.

Example 10

In one example, signaling the indication (e.g., a codeword) of a cross-component coding tool may be skipped for a video unit if the dimension of the luma block of the video unit satisfies certain conditions as follows. The conditions may comprise that the luma block is further split using at least one EQT. In one example, the conditions may comprise the dimension of any child/sub block in luma block unit is equal to W*H (e.g., W=4 or H=4), and/or at least one partitioning (e.g., TT or EQT or BT or QT) is applied. In one example, the conditions may comprise the dimension of the luma block of the video unit is equal to W*H (e.g., W=16||H=8), and/or vertical EQT is applied. In one example, the conditions may comprise the dimension of the luma block of the video unit is equal to W*H (e.g., H=16||W=8), and/or horizontal EQT is applied. In one example, the conditions may comprise the dimension of the luma block of the video unit is equal to W*H (e.g., W=8), and/or QT is applied. In one example, the conditions may comprise the dimension of the luma block of the video unit is equal to W*H (e.g., W=8), and/or vertical BT is applied. In one example, the conditions may comprise the dimension of the luma block of the video unit is equal to W*H (e.g., H=8), and/or horizontal BT is applied. The dimension (Width*Height) of a block is equal to W*H may refer to that Width is equal to W and/or Height is equal to H. In the above bullets, "equal to" may be replaced by "larger than" or "smaller than" or "no larger than" or "no smaller than".

Example 11

In an example, signaling the indication (e.g., a codeword) of a cross-component coding tool may be skipped for a video unit if the dimension of the luma block of the video unit satisfies certain conditions and the luma block is further split using at least one of QT, BT, or EQT, and the luma block contains at least one luma sample coded with mode X. In one example, the conditions may comprise the dimension of any child/sub block in luma block unit is equal to W*H (e.g., W=4 or H=4), and/or at least one partitioning (e.g., TT or EQT or BT or QT) is applied. In one example, the conditions may comprise the dimension of the luma block of the video unit is equal to W*H (e.g., W=16||H=8), and/or vertical EQT is applied, and/or the video unit contains at least one luma sample coded with mode X. In one example, the conditions may comprise the dimension of the luma block of the video unit is equal to W*H (e.g., H=16||W=8), and/or horizontal EQT is applied, and/or the video unit contains at least one luma sample coded with mode X. In one example, the conditions may comprise the dimension of the luma block of the video unit is equal to W*H (e.g., W=8), and/or QT is applied, and/or the video unit contains at least one luma sample coded with mode X. In one example, the conditions may comprise the dimension of the luma block of the video unit is equal to W*H (e.g., W=8), and/or vertical BT is applied and/or the video unit contains at least one luma sample coded with mode X. In one example, the conditions may comprise the dimension of the luma block of the video unit is equal to W*H (e.g., H=8), and/or horizontal BT is applied and/or the video unit contains at least one luma sample coded with mode X. The dimension (Width*Height) of a block is equal to W*H may refer to that Width is equal to W and/or Height is equal to H. In the above bullets, "equal to" may be replaced by "larger than" or "smaller than" or "no larger than" or "no smaller than".

Example 12

In one example, if separate tree coding is used, and at least one luma block in a first separate tree region is coded with mode X, then the indication (e.g., a codeword) that represents the cross-component coding tool may be removed or skipped for a first chroma block which is also in the first separate tree region.

Example 13

In one example, the mode X may be as follows. In one example, mode X may be any mode excluding intra-coding mode. In one example, X may be inter-coding mode. In one example, X may be IBC mode. In one example, X may be string copy mode. In one example, X may be ISP mode. In one example, X may be one of any modes including inter, IBC, string copy, ISP mode, or combinations thereof.

Example 14

In an example, when the signaling of the indication of a cross-component coding tool is skipped, the usage of such a cross-component coding tools is inferred to be disabled.

Example 15

In one example, the method may be applied to a first cross-component coding tool but not be applied to a second cross-component coding tool. The first and/or second cross-component coding tool may be TSCPM, TSCPM-Left, TSCPM-Above and/or PMC.

Example 16

In one example, whether to and/or how to apply methods disclosed above may depend on, coding information such as slice type or picture type, information signaled from encoder to decoder such as in sequence parameter set (SPS), sequence header, picture parameter set (PPS), picture header, slice header, CTU, CU, etc., color format such as luma blue difference chrom and red difference chroma (YCbCr) or red green blue (RGB), or 4:2:0 or 4:4:4 or 4:2:0, and/or standard level or profiles.

A first example embodiment is now discussed. A coding unit definition is now discussed. The coding unit definitions are shown in the table below.

| Coding unit definition | Descriptor |
|---|---|
| coding_unit(x0, y0, width, height, mode, component) { | |
|   if (component == 'COMPONENT_Chroma') { | |
|     if ((PriorCuMode != 0) && (chroma_format != '00')) | |
|       intra_chroma_pred_mode_index | ae(v) |
|     if ((TscpmEnableFlag ‖ PmcEnableFlag) && (isLumaAllIntra) && (IntraChromaPredModeIndex == 1)) { | |
|       if (EnhancedTscpmEnableFlag ‖ PmcEnableFlag) { | |
|         chroma_eipm_index | ae(v) |
|       } | |
|       if (PmcEnableFlag && TscpmEnableFlag && (EnhancedTscpmEnableFlag ‖ (IntraChromaEnhancedMode == 0))) { | |
|         chroma_pmc_index | ae(v) |
|       } | |
|       if (ChromaPmcIndex) { | |
|         chroma_pmc_param_index | ae(v) |
|       } | |
|     } | |
| } | |

A coding unit is now described. If isRedundant has a value of one, intra_chroma_pred_mode_index should not be ((TscpmEnableFlag‖PmcEnableFlag) && !((isLumaAllIntra==0) && (component 'COMPONENT_Chroma')))? 5:4)).

isLumaAllIntra, which is a luminance full intra mode flag, is now described. When all coding unit modes of a luminance region corresponding to the current chroma coding unit are not inter prediction modes, and none of them are IBC mode or SP mode, isLumaAllIntra has a value of 1. Otherwise, isLumaAllIntra has a value of 0.

A ctxIdxInc of intra_chroma_pred_mode_index can be determined according to the following method.

if binIdx equal 0, ctxIdxInc equal 0;
  else if TscpmEnableFlag has a value equal to 1 and !((isLumaAllIntra==0)&&
    (component=='COMPONENT_Chroma')) and binIdx is equal to 1, ctxIdxInc is equal 2;
  else if PmcEnableFlag has a value equal to 1 and !((isLumaAllIntra==0)&&
    (component=='COMPONENT_Chroma')) and binIdx is equal 1, ctxIdxInc is equal 2
  else, ctxIdxInc has a value equal 1.

This following clause defines the debinarization method for syntax elements.

Debinarization Methods for Syntax Elements

| syntax element | Inverse binarization method |
| --- | --- |
| lcu_qp_delta | See 8.3.4.5 |
| sao_merge_type_index | See 8.3.4.6 |
| sao_mode | See 8.3.4.2, maxVal=2, the value of sao_mode is equal to synElVal. |
| sao_interval_offset_abs | See 8.3.4.2, max Val=7, the value of sao_interval_offset_abs is equal to synElVal. |
| sao_interval_offset_sign | See 8.3.4.4, the value of sao_interval_offset_sign is equal to synElVal. |
| sao_interval_start_pos | See 8.3.4.7 |
| sao_interval_delta_pos_minus2 | See 8.3.4.8 |
| sao_edge_offset[compIdx][j] (j = 0~3) | See 8.3.4.9 |
| sao_edge_type | See 8.3.4.10 |
| alf_lcu_enable_flag | See 8.3.4.4, the value of alf_lcu_enable_flagthe is equal to synElVal. |
| aec_lcu_stuffing_bit | See 8.3.4.4, the value of aec_lcu_stuffing_bit is equal to synElVal. |
| qt_split_flag | See 8.3.4.4, the value of qt_split_flag is equal to synElVal. |
| bet_split_flag | See 8.3.4.4, the value of bet_split_flag is equal to synElVal. |
| bet_split_type_flag | See 8.3.4.4, the value of bet_split_type_flag is equal to synElVal. |
| root_cu_constraint | See 8.3.4.4, the value of root_cu_constraintthe is equal to synElVal. |
| intra_chroma_pred_mode_index | See 8.3.4.2, maxVal=((TscpmEnableFlag \|\| PmcEnableFlag)&&(!((isLumaAllIntra==0)&&(component == 'COMPONENT_Chroma'))) ? 5 : 4)), the value of intra_chroma_pred_mode_index is equal to synElVal. |

30

Normal intra prediction mode is discussed. In a first step, the value of IntraChromaPredMode can be calculated as follows.

In a second step, the value of IntraChromaPredMode can be used to obtain the intra prediction mode of the chroma prediction block.

```
if ((TscpmEnableFlag || PmcEnableFlag)&&(!((isLumaAllIntra==0)&&( component ==
'COMPONENT_Chroma')))&& (IntraLumaPredModeIndex == 1)) {
IntraChromaPredMode = 5 + ChromaEipmIndex + 3 * ChromaPmcIndex + 3 *
ChromaPmcParamIndex * (1 + PicturePmcParamIndex)
}
else {
    if (TscpmEnableFlag &&(!((isLumaAllIntra==0)&& (component ==
    'COMPONENT_Chroma')))&& (IntraLumaPredModeIndex != 0)) {
    IntraLumaPredModeIndex = IntraLumaPredModeIndex - 1
    }
    if (! isRedundant) {
    IntraChromaPredMode = IntraChromaPredModeIndex
    }
    else {
        if (IntraLumaPredMode == 0) {
        predIntraChromaPredMode = 1
        }
        else if (IntraLumaPredMode == 2) {
        predIntraChromaPredMode = 4
        }
        else if (IntraLumaPredMode == 12) {
        predIntraChromaPredMode = 3
        }
        else if (IntraLumaPredMode == 24) {
        predIntraChromaPredMode = 2
        }
        if (IntraLumaPredModeIndex == 0) {
        IntraChromaPredMode = 0
        }
        else if (IntraLumaPredModeIndex < predIntraChromaPredMode) {
        IntraChromaPredMode = IntraLumaPredModeIndex
        }
        else {
        IntraChromaPredMode = IntraLumaPredModeIndex + 1
        }
    }
}
```

A second example embodiment is now discussed. A coding unit definition is now discussed. The coding unit definitions are shown in the table below.

| Coding unit definition | Descriptor |
|---|---|
| coding_unit(x0, y0, width, height, mode, component) {   if (component == 'COMPONENT_Chroma') {     if ((PriorCuMode != 0) && (chroma_format != '00'))       intra_chroma_pred_mode_index     NumOfTransBlocks = 3     ctp_y[0] = 0 | ae(v) |

A coding unit is now described. If isRedundant has a value of one, intra_chroma_pred_mode_index should not be ((TscpmEnableFlag II PmcEnableFlag) && (component !='COMPONENT_Chroma')))? 5: 4)).

A ctxIdxInc of intra_chroma_pred_mode_index can be determined according to the following method.
  if binIdx has a value equal to 0, ctxIdxInc is equal to 0;
  else if TscpmEnableFlag has a value equal to 1 and component !='COMPONENT_Chroma')) and binIdx is equal to 1, ctxIdxInc is equal to 2;
  else if PmcEnableFlag has a value equal to 1 and component !='COMPONENT_Chroma')) and binIdx is equal 1, ctxIdxInc is equal to 2
  else, ctxIdxInc has a value equal to 1.

The following clause defines the debinarization method for syntax elements.

Debinarization Methods for Syntax Elements

| syntax element | Inverse binarization method |
|---|---|
| lcu_qp_delta | See 8.3.4.5 |
| sao_merge_type_index | See 8.3.4.6 |
| sao_mode | See 8.3.4.2, maxVal=2, the value of sao_mode is equal to synElVal. |
| sao_interval_offset_abs | See 8.3.4.2, maxVal=7, the value of sao_interval_offset_abs is equal to synElVal. |
| sao_interval_offset_sign | See 8.3.4.4, the value of sao_interval_offset_sign is equal to synElVal. |
| sao_interval_start_pos | See 8.3.4.7 |
| sao_interval_delta_pos_minus2 | See 8.3.4.8 |
| sao_edge_offset[compIdx][j] (j = 0~3) | See 8.3.4.9 |
| sao_edge_type | See 8.3.4.10 |
| alf_lcu_enable_flag | See 8.3.4.4, the value of alf_lcu_enable_flagthe is equal to synElVal. |
| aec_lcu_stuffing_bit | See 8.3.4.4, the value of aec_lcu_stuffing_bit is equal to synElVal. |
| qt_split_flag | See 8.3.4.4, the value of qt_split_flag is equal to synElVal. |
| bet_split_flag | See 8.3.4.4, the value of bet_split_flag is equal to synElVal. |
| bet_split_type_flag | See 8.3.4.4, the value of bet_split_type_flag is equal to synElVal. |
| root_cu_constraint | See 8.3.4.4, the value of root_cu_constraintthe is equal to synElVal. |
| intra_chroma_pred_mode_index | See 8.3.4.2, maxVal=((TscpmEnableFlag \|\| PmcEnableFlag)&&(component != 'COMPONENT_Chroma'))) ? 5 : 4)), the value of intra_chroma_pred_mode_index is equal to synElVal. |

Normal intra prediction mode is discussed. In a first step, the value of IntraChromaPredMode can be calculated as follows.

```
if ((TscpmEnableFlag || PmcEnableFlag)&&( component !=
'COMPONENT_Chroma')))&& (IntraLumaPredModeIndex == 1)) {
IntraChromaPredMode = 5 + ChromaEipmIndex + 3 * ChromaPmcIndex + 3 *
ChromaPmcParamIndex * (1 + PicturePmcParamIndex)
}
else {
    if (TscpmEnableFlag &&(component != 'COMPONENT_Chroma')))&&
    (IntraLumaPredModeIndex != 0)) {
    IntraLumaPredModeIndex = IntraLumaPredModeIndex - 1
    }
    if (! isRedundant) {
    IntraChromaPredMode = IntraChromaPredModeIndex
    }
    else {
        if (IntraLumaPredMode == 0) {
        predIntraChromaPredMode = 1
        }
        else if (IntraLumaPredMode == 2) {
        predIntraChromaPredMode = 4
        }
```

```
      else if (IntraLumaPredMode == 12) {
        predIntraChromaPredMode = 3
      }
      else if (IntraLumaPredMode == 24) {
        predIntraChromaPredMode = 2
      }
      if (IntraLumaPredModeIndex == 0) {
        IntraChromaPredMode = 0
      }
      else if (IntraLumaPredModeIndex < predIntraChromaPredMode) {
        IntraChromaPredMode = IntraLumaPredModeIndex
      }
      else {
        IntraChromaPredMode = IntraLumaPredModeIndex + 1
      }
    }
  }
}
```

In a second step, the value of IntraChromaPredMode can be used to obtain the intra prediction mode of the chroma prediction block.

A third example embodiment is now discussed. A coding unit definition is now discussed. The coding unit definitions are shown in the table below.

| Coding unit definition | Descriptor |
|---|---|
| coding_unit(x0, y0, width, height, mode, component) { | |
|   if (component == 'COMPONENT_Chroma') { | |
|     if ((PriorCuMode != 0) && (chroma_format != '00')) | |
|       intra_chroma_pred_mode_index | ae(v) |
|     if ((TscpmEnableFlag \|\| (PmcEnableFlag&& isLumaAllIntra)) && (IntraChromaPredModeIndex == 1)) { | |
|       if ((EnhancedTscpmEnableFlag \|\| PmcEnableFlag) && isLumaAllIntra) { | |
|         chroma_eipm_index | ae(v) |
|       } | |
|       if (isLumaAllIntra &&PmcEnableFlag && TscpmEnableFlag && (EnhancedTscpmEnableFlag \|\| (IntraChromaEnhancedMode == 0))) { | |
|         chroma_pmc_index | ae(v) |
|       } | |
|       if (ChromaPmcIndex) { | |
|         chroma_pmc_param_index | ae(v) |
|       } | |
|     } | |

A coding unit is now described. If isRedundant has a value of one, intra_chroma_pred_mode_index should not be ((TscpmEnableFlag II PmcEnableFlag) && !((isLumaAllIntra==0) && (component 'COMPONENT_Chroma')))? 5:4)).

isLumaAllIntra, which is a luminance full intra mode flag, is now described. When all coding unit modes of the luminance region corresponding to the current chroma coding unit are not inter prediction modes, and none of them are IBC mode or SP mode, isLumaAllIntra has a value of 1. Otherwise, isLumaAllIntra has a value of 0.

A ctxIdxInc of intra_chroma_pred_mode_index can be determined according to the following method.

if binIdx has a value equal to 0, ctxIdxInc is equal to 0;
    else if TscpmEnableFlag has a value equal to 1 and binIdx is equal to 1, ctxIdxInc is equal 2;
    else if PmcEnableFlag has a value equal to 1 and VisLumaAllIntra==0)&&
      (component=='COMPONENT_Chroma')) and binIdx is equal 1, ctxIdxInc is equal 2
    else, ctxIdxInc has a value equal to 1.

This following clause defines debinarization methods for syntax elements.

Debinarization Methods for Syntax Elements

| syntax element | Inverse binarization method |
| --- | --- |
| lcu_qp_delta | See 8.3.4.5 |
| sao_merge_type_index | See 8.3.4.6 |
| sao_mode | See 8.3.4.2, maxVal=2, the value of sao_mode is equal to synElVal. |
| sao_interval_offset_abs | See 8.3.4.2, maxVal=7, the value of sao_interval_offset_abs is equal to synElVal. |
| sao_interval_offset_sign | See 8.3.4.4, the value of sao_interval_offset_sign is equal to synElVal. |
| sao_interval_start_pos | See 8.3.4.7 |
| sao_interval_delta_pos_minus2 | See 8.3.4.8 |
| sao_edge_offset[compIdx][j] (j = 0~3) | See 8.3.4.9 |
| sao_edge_type | See 8.3.4.10 |
| alf_lcu_enable_flag | See 8.3.4.4, the value of alf_lcu_enable_flagthe is equal to synElVal. |
| aec_lcu_stuffing_bit | See 8.3.4.4, the value of aec_lcu_stuffing_bit is equal to synElVal. |
| qt_split_flag | See 8.3.4.4, the value of qt_split_flag is equal to synElVal. |
| bet_split_flag | See 8.3.4.4, the value of bet_split_flag is equal to synElVal. |
| bet_split_type_flag | See 8.3.4.4, the value of bet_split_type_flag is equal to synElVal. |
| root_cu_constraint | See 8.3.4.4, the value of root_cu_constraintthe is equal to synElVal. |
| intra_chroma_pred_mode_index | See 8.3.4.2, maxVal=((TscpmEnableFlag ∥ PmcEnableFlag)&&(!((isLumaAllIntra==0)&&(component == 'COMPONENT_Chroma') ? 5 : 4)), the value of intra_chroma_pred_mode_index is equal to synElVal. |

Normal intra prediction mode is discussed. In a first step, the value of IntraChromaPredMode can be calculated as follows.

In a second step, the value of IntraChromaPredMode can be used to obtain the intra prediction mode of the chroma prediction block.

```
if ((TscpmEnableFlag ∥ PmcEnableFlag)&&(!((isLumaAllIntra==0)&&( component ==
'COMPONENT_Chroma')))&& (IntraLumaPredModeIndex == 1)) {
IntraChromaPredMode = 5 + ChromaEipmIndex + 3 * ChromaPmcIndex + 3 *
ChromaPmcParamIndex * (1 + PicturePmcParamIndex)
}
else {
    if (TscpmEnableFlag && (IntraLumaPredModeIndex != 0)) {
    IntraLumaPredModeIndex = IntraLumaPredModeIndex − 1
    }
    if (! isRedundant) {
    IntraChromaPredMode = IntraChromaPredModeIndex
    }
else {
    if (IntraLumaPredMode == 0) {
    predIntraChromaPredMode = 1
    }
    else if (IntraLumaPredMode == 2) {
    predIntraChromaPredMode = 4
    }
    else if (IntraLumaPredMode == 12) {
    predIntraChromaPredMode = 3
    }
    else if (IntraLumaPredMode == 24) {
    predIntraChromaPredMode = 2
    }
    if (IntraLumaPredModeIndex == 0) {
    IntraChromaPredMode = 0
    }
    else if (IntraLumaPredModeIndex < predIntraChromaPredMode) {
    IntraChromaPredMode = IntraLumaPredModeIndex
    }
    else {
    IntraChromaPredMode = IntraLumaPredModeIndex + 1
    }
  }
}
```

A fourth example embodiment is now discussed. A coding unit definition is now discussed. The coding unit definitions are shown in the table below.

| Coding unit definition | Descriptor |
|---|---|
| coding_unit(x0, y0, width, height, mode, component) { | |
|   if (component == 'COMPONENT_Chroma') { | |
|     if ((PriorCuMode != 0) && (chroma_format != '00')) | |
|       intra_chroma_pred_mode_index | ae(v) |
|     if ((TscpmEnableFlag \|\| PmcEnableFlag) && (isLumaNotIBC) && (IntraChromaPredModeIndex == 1)) { | |
|       if (EnhancedTscpmEnableFlag \|\| PmcEnableFlag) { | |
|         chroma_eipm_index | ae(v) |
|       } | |
|       if (PmcEnableFlag && TscpmEnableFlag && (EnhancedTscpmEnableFlag \|\| (IntraChromaEnhancedMode == 0))) { | |
|         chroma_pmc_index | ae(v) |
|       } | |
|       if (ChromaPmcIndex) { | |
|         chroma_pmc_param_index | ae(v) |
|       } | |
|     } | |
|   } | |

A coding unit is now described. If isRedundant has a value of one, intra_chroma_pred_mode_index should not be ((TscpmEnableFlag II PmcEnableFlag) && !((isLumaNotIBC==0) && (component 'COMPONENT_Chroma')))? 5:4)).

isLumaAllIntra, which is a luminance full intra mode flag, is now described. When all coding unit modes of the luminance region corresponding to the current chroma coding unit are not inter prediction modes, and none of them are IBC mode or SP mode, isLumaAllIntra has a value of 1. Otherwise, isLumaAllIntra has a value of 0.

A ctxIdxInc of intra_chroma_pred_mode_index can be determined according to the following method.

if binIdx has a value equal to 0, ctxIdxInc equal 0;
else if TscpmEnableFlag has a value equal to 1 and !((isLumaNotIBC==0)&& (component=='COMPONENT_Chroma')) and binIdx is equal to 1, ctxIdxInc is equal 2;
else if PmcEnableFlag has a value equal to 1 and !((isLumaNotIBC==0)&& (component=='COMPONENT_Chroma')) and binIdx is equal 1, ctxIdxInc is equal 2;
else, ctxIdxInc has a value equal to 1.
This following clause defines debinarization methods for syntax elements.

Debinarization Methods for Syntax Elements

| syntax element | Inverse binarization method |
|---|---|
| lcu_qp_delta | See 8.3.4.5 |
| sao_merge_type_index | See 8.3.4.6 |
| sao_mode | See 8.3.4.2, maxVal=2, the value of sao_mode is equal to synElVal. |
| sao_interval_offset_abs | See 8.3.4.2, maxVal=7, the value of sao_interval_offset_abs is equal to synElVal. |
| sao_interval_offset_sign | See 8.3.4.4, the value of sao_interval_offset_sign is equal to synElVal. |
| sao_interval_start_pos | See 8.3.4.7 |
| sao_interval_delta_pos_minus2 | See 8.3.4.8 |
| sao_edge_offset[compIdx][j] (j = 0~3) | See 8.3.4.9 |
| sao_edge_type | See 8.3.4.10 |
| alf_lcu_enable_flag | See 8.3.4.4, the value of alf_lcu_enable_flagthe is equal to synElVal. |
| aec_lcu_stuffing_bit | See 8.3.4.4, the value of aec_lcu_stuffing_bit is equal to synElVal. |
| qt_split_flag | See 8.3.4.4, the value of qt_split_flag is equal to synElVal. |
| bet_split_flag | See 8.3.4.4, the value of bet_split_flag is equal to synElVal. |
| bet_split_type_flag | See 8.3.4.4, the value of bet_split_type_flag is equal to synElVal. |
| root_cu_constraint | See 8.3.4.4, the value of root_cu_constraintthe is equal to synElVal. |
| intra_chroma_pred_mode_index | See 8.3.4.2, maxVal=((TscpmEnableFlag \|\| PmcEnableFlag)&&(!((isLumaNotIBC==0)&&(component == 'COMPONENT_Chroma'))) ? 5 : 4)), the value of intra_chroma_pred_mode_index is equal to synElVal. |

Normal intra prediction mode is discussed. The value of IntraChromaPredMode can be calculated as follows.

```
if ((TscpmEnableFlag || PmcEnableFlag)&&(!((isLumaNotIBC==0)&&( component ==
'COMPONENT_Chroma')))&& (IntraLumaPredModeIndex == 1)) {
IntraChromaPredMode = 5 + ChromaEipmIndex + 3 * ChromaPmcIndex + 3 *
ChromaPmcParamIndex * (1 + PicturePmcParamIndex)
}
else {
    if (TscpmEnableFlag &&(!((isLumaNotIBC==0)&&( component ==
    'COMPONENT_Chroma')))&& (IntraLumaPredModeIndex != 0)) {
    IntraLumaPredModeIndex = IntraLumaPredModeIndex - 1
    }
    if (! isRedundant) {
    IntraChromaPredMode = IntraChromaPredModeIndex
    }
else {
    if (IntraLumaPredMode == 0) {
    predIntraChromaPredMode = 1
    }
    else if (IntraLumaPredMode == 2) {
    predIntraChromaPredMode = 4
    }
    else if (IntraLumaPredMode == 12) {
    predIntraChromaPredMode = 3
    }
    else if (IntraLumaPredMode == 24) {
    predIntraChromaPredMode = 2
    }
    if (IntraLumaPredModeIndex == 0) {
    IntraChromaPredMode = 0
    }
    else if (IntraLumaPredModeIndex < predIntraChromaPredMode) {
    IntraChromaPredMode = IntraLumaPredModeIndex
    }
    else {
    IntraChromaPredMode = IntraLumaPredModeIndex + 1
    }
  }
}
```

The value of IntraChromaPredMode can be used to obtain the intra prediction mode of the chroma prediction block.

Figure 8:
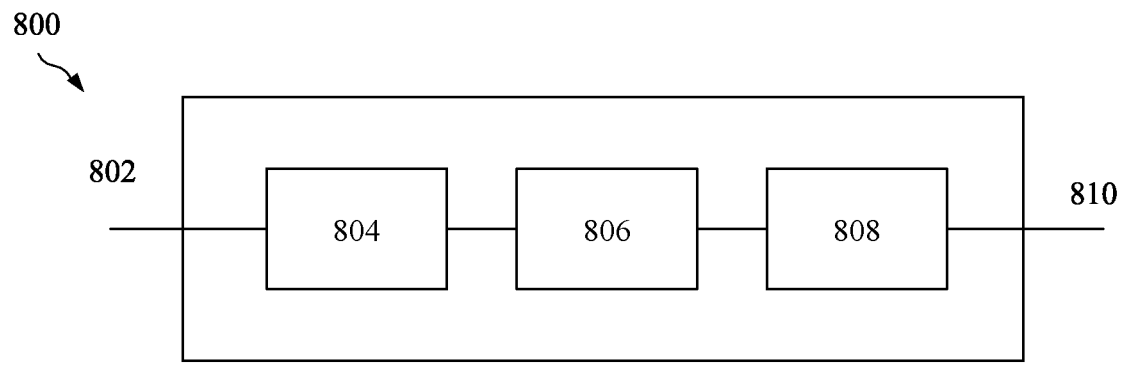
FIG. 8 is a block diagram showing an example video processing system.

FIG. 8 is a block diagram showing an example video processing system 800 in which various techniques disclosed herein may be implemented. Various implementations may include some or all of the components of the system 800. The system 800 may include input 802 for receiving video content. The video content may be received in a raw or uncompressed format, e.g., 8 or 10 bit multi-component pixel values, or may be in a compressed or encoded format. The input 802 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 800 may include a coding component 804 that may implement the various coding or encoding methods described in the present document. The coding component 804 may reduce the average bitrate of video from the input 802 to the output of the coding component 804 to produce a coded representation of the video. The coding techniques are therefore sometimes called video compression or video transcoding techniques. The output of the coding component 804 may be either stored, or transmitted via a communication connected, as represented by the component 806. The stored or communicated bitstream (or coded) representation of the video received at the input 802 may be used by a component 808 for generating pixel values or displayable video that is sent to a display interface 810. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 9:
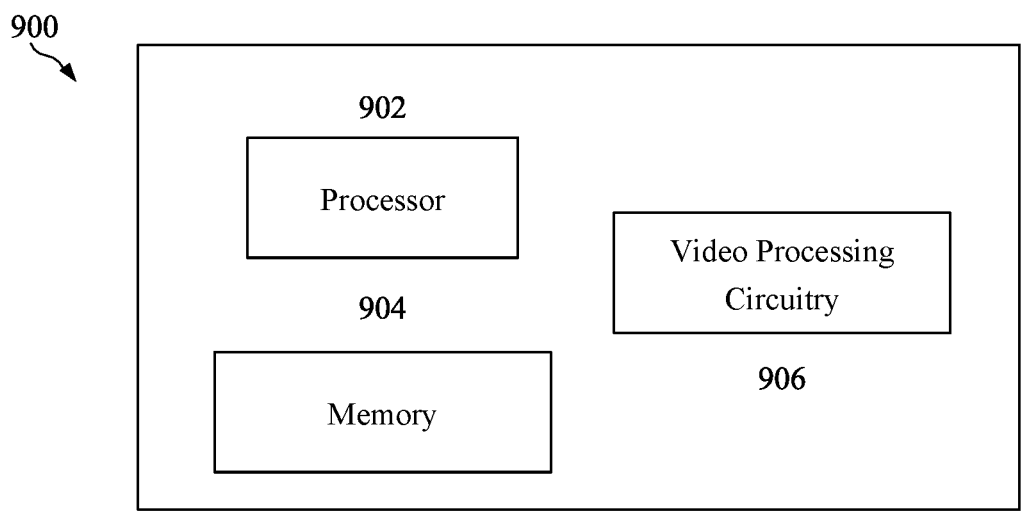
FIG. 9 is a block diagram of an example video processing apparatus.

FIG. 9 is a block diagram of an example video processing apparatus 900. The apparatus 900 may be used to implement one or more of the methods described herein. The apparatus 900 may be embodied in a smartphone, tablet, computer, Internet of Things (IoT) receiver, and so on. The apparatus 900 may include one or more processors 902, one or more memories 904 and video processing circuitry 906. The processor(s) 902 may be configured to implement one or more methods described in the present document. The memory (memories) 904 may be used for storing data and code used for implementing the methods and techniques described herein. The video processing circuitry 906 may be used to implement, in hardware circuitry, some techniques described in the present document. In some embodiments, the video processing circuitry 906 may be at least partly included in the processor 902, e.g., a graphics co-processor.

Figure 10:
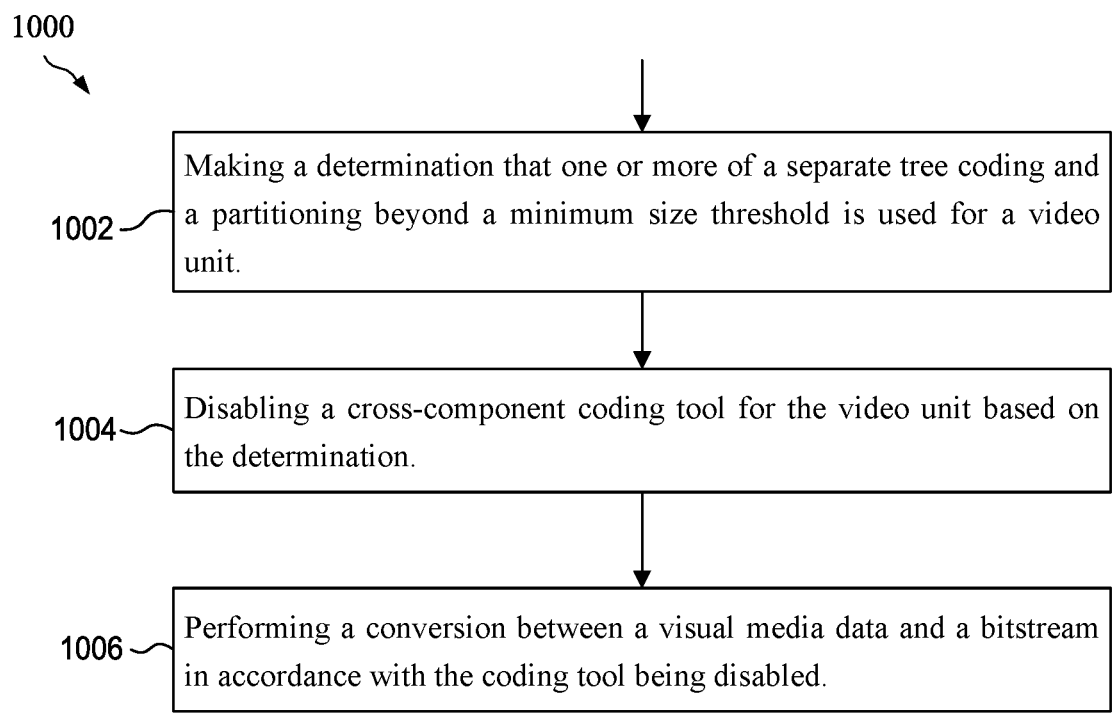
FIG. 10 is a flowchart for an example method of video processing.

FIG. 10 is a flowchart for an example method 1000 of video processing implemented by a video coding apparatus.

The method 1000 includes making a determination that one or more of a separate tree coding and a partitioning beyond a minimum size threshold is used for a video unit at step 1002. At step 1004, a cross-component coding tool for the video unit is disabled based on the determination. At step 1006, a conversion is performed between a visual media data and a bitstream in accordance with the coding tool being disabled. The video unit may be a sequence, picture, slice, sub-picture, CTU, CU, PU, TU, PB, CB, TB, and/or a region within one slice or picture.

The cross-component coding tool that is disabled in step 1004 is any coding tool that uses one component to predict another component, such as a coding tool that employs luma components to predict chroma components (e.g., Cr and/or Cb). In an example, the cross-component coding tool that is disabled is a two-step cross-component prediction mode (TSCPM) as described with respect to FIGS. 1-4. Specific examples of TSCPM may include a left TSCPM (TSCPM-Left) that employs left neighboring luma samples to predict chroma samples in the current block and/or an above TSCPM (TSCPM-Above) that employs above neighboring luma samples to predict chroma samples in the current block. In another example, the cross-component coding tool that is disabled is PMC as discussed with respect to FIG. 5. It should be noted that one or more cross-component coding tool may be disabled based on various conditions. Further, in some examples, different conditions may be applied to different cross-component coding tools.

In some examples, the cross-component coding tool is disabled at step 1004 when the video unit is determined to contain a partitioning of a luma block and the luma block is determined to contain a dimension at the minimum size threshold at step 1002. Stated differently, the cross-component coding tool is disabled when a luma block is partitioned to create a sub-block that contains a dimension smaller than the minimum size threshold. The minimum size threshold may vary depending on the type of partitioning used (e.g., the type of partition applied to create the smallest luma sub-block). For example, the minimum size threshold may be a width of four or a height of four for any partition. Accordingly, any partition that results in a luma block with a width or height that is smaller than four may result in the cross-component coding tool being disabled. In an example, the minimum size threshold may be a width of eight or a height of sixteen when the partitioning is horizontal EQT as shown in diagram 600. Hence, a horizontal EQT that results in a luma block with a width smaller than eight or a height smaller than sixteen may result in the cross-component coding tool being disabled. In an example, the minimum size threshold is a width of sixteen or a height of eight when the partitioning is vertical EQT as shown in diagram 600. Hence, a vertical EQT that results in a luma block with a height smaller than eight or a width smaller than sixteen may result in the cross-component coding tool being disabled. In an example, the minimum size threshold is a width of eight or a height of eight when the partitioning is QT, which is a partition that employs a vertical split and a horizontal split to split a block into four equal sub-blocks. Hence, a QT that results in a luma block with a height or a width smaller than eight may result in the cross-component coding tool being disabled.

In some examples, the minimum size threshold is a width of eight when the partitioning is a vertical BT, which is a partition that employs a single vertical split to create two sub-blocks. Hence, a vertical BT that results in a luma block with a width smaller than eight may result in the cross-component coding tool being disabled. In some examples, the minimum size threshold is a height of eight when the partitioning is a horizontal BT, which is a partition that employs a single horizontal split to create two sub-blocks. Hence, a horizontal BT that results in a luma block with a height smaller than eight may result in the cross-component coding tool being disabled. In some examples, the minimum size threshold is an area of 32×16 when the partitioning is a horizontal EQT. Hence, a horizontal EQT that results in a luma block with an area smaller than 32×16 may result in the cross-component coding tool being disabled. In some examples, the minimum size threshold is an area of 16×32 when the partitioning is a vertical EQT. Hence, a vertical EQT that results in a luma block with an area smaller than 16×32 may result in the cross-component coding tool being disabled.

In other examples, the cross-component coding tool is disabled at step 1004 when the video unit is determined to contain a partitioning of a luma block, the luma block is determined to contain a dimension at the minimum size threshold, and the luma block is determined to contain a luma sample coded by a specified mode at step 1002. In this example, the cross-component coding tool is disabled only when any of the previously mentioned partitions result in a luma block below the minimum size threshold and further when at least one sample of the luma block is coded according to the specified mode. The specified mode may be inter-coding mode, intra block copy (IBC) mode, string copy mode, intra sub-partitioning (ISP) mode, or combinations thereof.

In another example, the cross-component coding tool is disabled at step 1004 when a video unit is determined to employ separate tree coding and when the video unit is determined to contain a chroma block in a separate tree region of the video unit a luma block in the separate tree region of the video unit is coded with the specified mode. The specified mode may be any mode mentioned above. Separate tree coding is a mechanism for employing a different partition tree for the luma components at the chroma components. Accordingly, the present example disables the cross-component coding tool for a chroma block when luma and chroma are coded with separate coding trees and one or more luma samples that correspond to the chroma block (e.g., are part of the same separate tree region) are coded with the specified mode.

In some examples, a codeword representing the cross-component coding tool is omitted from the bitstream at step 1006 when the cross-component coding tool is disabled at step 1004 based on any of the criteria listed above. For example, the encoder may determine to disable the cross-component coding tool based on the criteria, and hence may not include signaling related to the disabled cross-component coding tool in the bitstream at step 1006. Further, the decoder may determine to disable the cross-component coding tool based on the criteria and/or may infer from lack of information in the bitstream related to the cross-component coding tool that the cross-component coding tool is disabled. Hence, bitstream compression is increased and the amount of signaling is reduced.

In an example, the conversion of step 1006 may be further performed in accordance with coding information for the video unit, a sequence parameter set (SPS), a sequence header, a picture parameter set (PPS), a picture header, a slice header, a coding tree unit (CTU), a coding unit (CU), color format information, standard level, profiles, or combinations thereof.

It should be noted that the method 1000 can be implemented in an apparatus for processing video data comprising a processor and a non-transitory memory with instructions thereon, such as video encoder 1200, video decoder 1300, and/or encoder 1400. In such a case, the instructions upon execution by the processor, cause the processor to perform the method 1000. Further, the method 1000 can be performed by a non-transitory computer readable medium comprising a computer program product for use by a video coding device. The computer program product comprises computer executable instructions stored on the non-transitory computer readable medium such that when executed by a processor cause the video coding device to perform the method 1000. Further, the method 1000 can be performed by an encoder or a decoder. When performed by an encoder, the conversion between visual media data and bitstream includes encoding the visual media data into the bitstream. When performed by an encoder, the conversion between visual media data and bitstream includes decoding the bitstream to reconstruct the visual media data.

Figure 11:
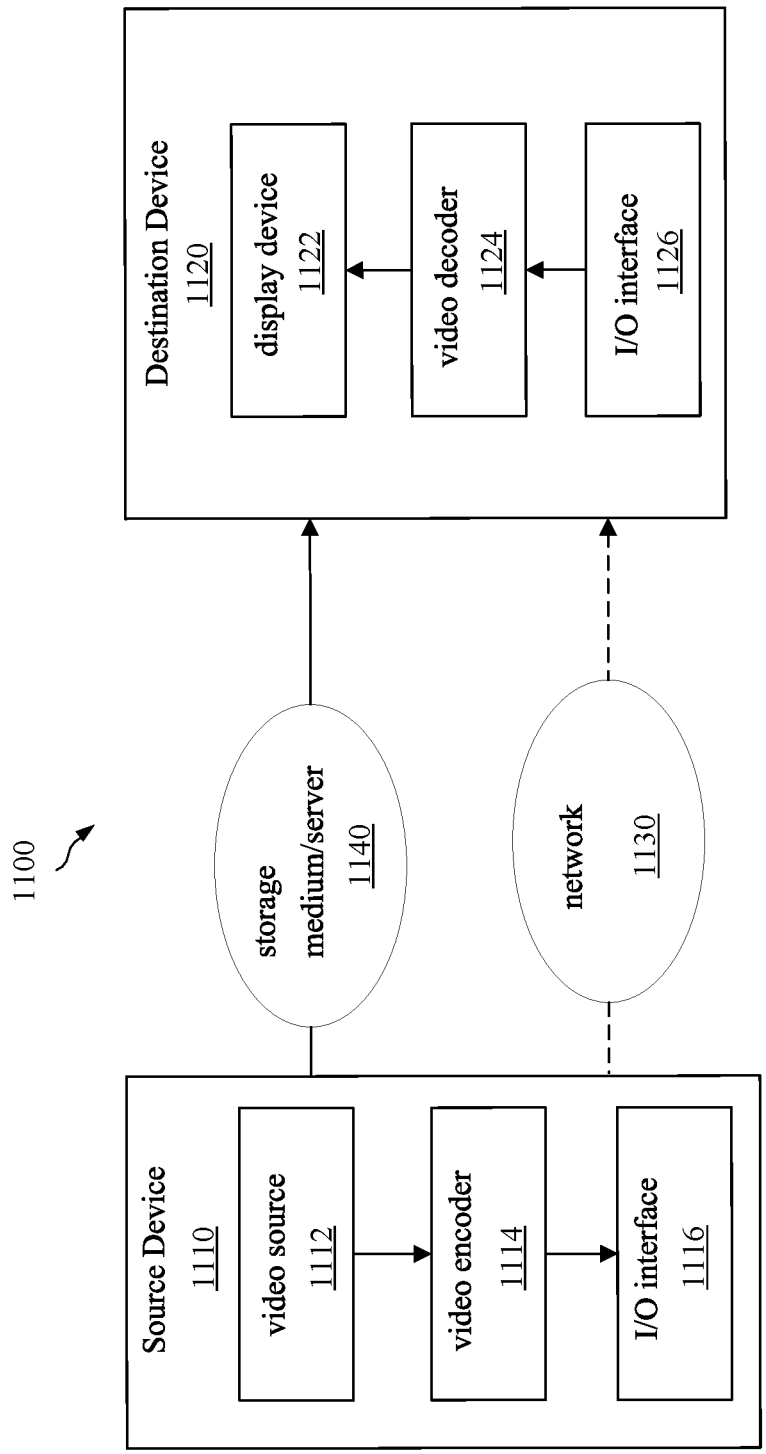
FIG. 11 is a block diagram that illustrates an example video coding system.

FIG. 11 is a block diagram that illustrates an example video coding system 1100 that may utilize the techniques of this disclosure. As shown in FIG. 11, video coding system 1100 may include a source device 1110 and a destination device 1120. Source device 1110 generates encoded video data which may be referred to as a video encoding device. Destination device 1120 may decode the encoded video data generated by source device 1110 which may be referred to as a video decoding device.

Source device 1110 may include a video source 1112, a video encoder 1114, and an input/output (I/O) interface 1116. Video source 1112 may include a source such as a video capture device, an interface to receive video data from a video content provider, and/or a computer graphics system for generating video data, or a combination of such sources. The video data may comprise one or more pictures. Video encoder 1114 encodes the video data from video source 1112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 1116 may include a modulator/demodulator (modem) and/or a transmitter. The encoded video data may be transmitted directly to destination device 1120 via I/O interface 1116 through network 1130. The encoded video data may also be stored onto a storage medium/server 1140 for access by destination device 1120.

Destination device 1120 may include an I/O interface 1126, a video decoder 1124, and a display device 1122. I/O interface 1126 may include a receiver and/or a modem. I/O interface 1126 may acquire encoded video data from the source device 1110 or the storage medium/server 1140. Video decoder 1124 may decode the encoded video data. Display device 1122 may display the decoded video data to a user. Display device 1122 may be integrated with the destination device 1120, or may be external to destination device 1120, which can be configured to interface with an external display device.

Video encoder 1114 and video decoder 1124 may operate according to a video compression standard, such as the High Efficiency Video Coding (HEVC) standard, Versatile Video Coding (VVM) standard and other current and/or further standards.

Figure 12:
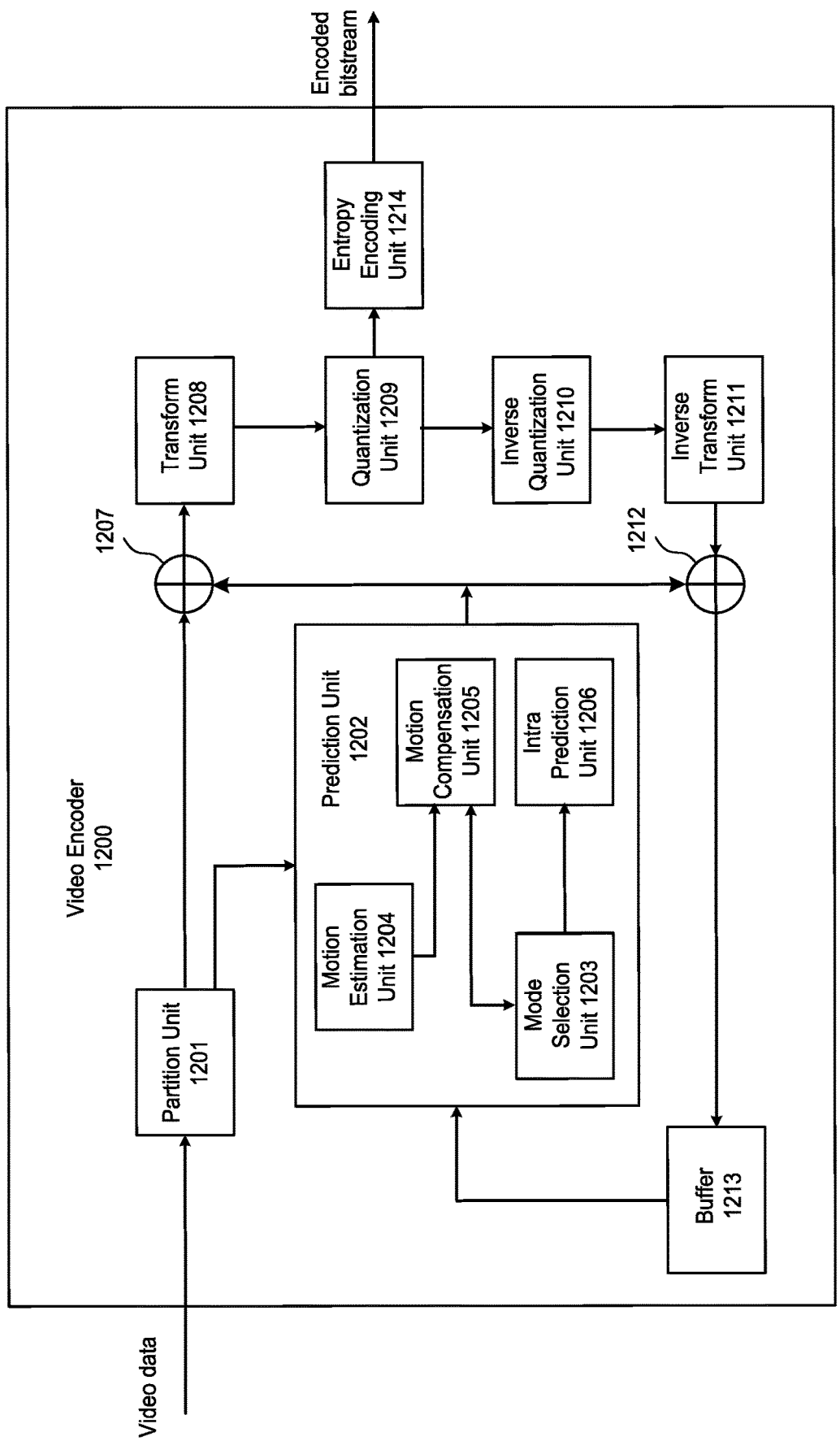
FIG. 12 is a block diagram that illustrates an example encoder.

FIG. 12 is a block diagram illustrating an example of video encoder 1200, which may be video encoder 1114 in the system 1100 illustrated in FIG. 11. Video encoder 1200 may be configured to perform any or all of the techniques of this disclosure. In the example of FIG. 12, video encoder 1200 includes a plurality of functional components. The techniques described in this disclosure may be shared among the various components of video encoder 1200. In some examples, a processor may be configured to perform any or all of the techniques described in this disclosure.

The functional components of video encoder 1200 may include a partition unit 1201, a prediction unit 1202 which may include a mode selection unit 1203, a motion estimation unit 1204, a motion compensation unit 1205, an intra prediction unit 1206, a residual generation unit 1207, a transform processing unit 1208, a quantization unit 1209, an inverse quantization unit 1210, an inverse transform unit 1211, a reconstruction unit 1212, a buffer 1213, and an entropy encoding unit 1214.

In other examples, video encoder 1200 may include more, fewer, or different functional components. In an example, prediction unit 1202 may include an intra block copy (IBC) unit. The IBC unit may perform prediction in an IBC mode in which at least one reference picture is a picture where the current video block is located.

Furthermore, some components, such as motion estimation unit 1204 and motion compensation unit 1205 may be highly integrated, but are represented in the example of FIG. 12 separately for purposes of explanation.

Partition unit 1201 may partition a picture into one or more video blocks. Video encoder 1200 and video decoder 1300 may support various video block sizes.

Mode selection unit 1203 may select one of the coding modes, intra or inter, e.g., based on error results, and provide the resulting intra or inter coded block to a residual generation unit 1207 to generate residual block data and to a reconstruction unit 1212 to reconstruct the encoded block for use as a reference picture. In some examples, mode selection unit 1203 may select a combination of intra and inter prediction (CIIP) mode in which the prediction is based on an inter prediction signal and an intra prediction signal. Mode selection unit 1203 may also select a resolution for a motion vector (e.g., a sub-pixel or integer pixel precision) for the block in the case of inter prediction.

To perform inter prediction on a current video block, motion estimation unit 1204 may generate motion information for the current video block by comparing one or more reference frames from buffer 1213 to the current video block. Motion compensation unit 1205 may determine a predicted video block for the current video block based on the motion information and decoded samples of pictures from buffer 1213 other than the picture associated with the current video block.

Motion estimation unit 1204 and motion compensation unit 1205 may perform different operations for a current video block, for example, depending on whether the current video block is in an I slice, a P slice, or a B slice.

In some examples, motion estimation unit 1204 may perform uni-directional prediction for the current video block, and motion estimation unit 1204 may search reference pictures of list 0 or list 1 for a reference video block for the current video block. Motion estimation unit 1204 may then generate a reference index that indicates the reference picture in list 0 or list 1 that contains the reference video block and a motion vector that indicates a spatial displacement between the current video block and the reference video block. Motion estimation unit 1204 may output the reference index, a prediction direction indicator, and the motion vector as the motion information of the current video block. Motion compensation unit 1205 may generate the predicted video block of the current block based on the reference video block indicated by the motion information of the current video block.

In other examples, motion estimation unit 1204 may perform bi-directional prediction for the current video block, motion estimation unit 1204 may search the reference pictures in list 0 for a reference video block for the current video block and may also search the reference pictures in list 1 for another reference video block for the current video block. Motion estimation unit 1204 may then generate reference indexes that indicate the reference pictures in list 0 and list 1 containing the reference video blocks and motion vectors that indicate spatial displacements between the reference video blocks and the current video block. Motion estimation unit 1204 may output the reference indexes and the motion vectors of the current video block as the motion information of the current video block. Motion compensation unit 1205 may generate the predicted video block of the current video block based on the reference video blocks indicated by the motion information of the current video block.

In some examples, motion estimation unit 1204 may output a full set of motion information for decoding processing of a decoder. In some examples, motion estimation unit 1204 may not output a full set of motion information for the current video. Rather, motion estimation unit 1204 may signal the motion information of the current video block with reference to the motion information of another video block. For example, motion estimation unit 1204 may determine that the motion information of the current video block is sufficiently similar to the motion information of a neighboring video block.

In one example, motion estimation unit 1204 may indicate, in a syntax structure associated with the current video block, a value that indicates to the video decoder 1300 that the current video block has the same motion information as another video block.

In another example, motion estimation unit 1204 may identify, in a syntax structure associated with the current video block, another video block and a motion vector difference (MVD). The motion vector difference indicates a difference between the motion vector of the current video block and the motion vector of the indicated video block. The video decoder 1300 may use the motion vector of the indicated video block and the motion vector difference to determine the motion vector of the current video block.

As discussed above, video encoder 1200 may predictively signal the motion vector. Two examples of predictive signaling techniques that may be implemented by video encoder 1200 include advanced motion vector prediction (AMVP) and merge mode signaling.

Intra prediction unit 1206 may perform intra prediction on the current video block. When intra prediction unit 1206 performs intra prediction on the current video block, intra prediction unit 1206 may generate prediction data for the current video block based on decoded samples of other video blocks in the same picture. The prediction data for the current video block may include a predicted video block and various syntax elements.

Residual generation unit 1207 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 1207 may not perform the subtracting operation.

Transform processing unit 1208 may generate one or more transform coefficient video blocks for the current video block by applying one or more transforms to a residual video block associated with the current video block.

After transform processing unit 1208 generates a transform coefficient video block associated with the current video block, quantization unit 1209 may quantize the transform coefficient video block associated with the current video block based on one or more quantization parameter (QP) values associated with the current video block.

Inverse quantization unit 1210 and inverse transform unit 1211 may apply inverse quantization and inverse transforms to the transform coefficient video block, respectively, to reconstruct a residual video block from the transform coefficient video block. Reconstruction unit 1212 may add the reconstructed residual video block to corresponding samples from one or more predicted video blocks generated by the prediction unit 1202 to produce a reconstructed video block associated with the current block for storage in the buffer 1213.

After reconstruction unit 1212 reconstructs the video block, the loop filtering operation may be performed to reduce video blocking artifacts in the video block.

Entropy encoding unit 1214 may receive data from other functional components of the video encoder 1200. When entropy encoding unit 1214 receives the data, entropy encoding unit 1214 may perform one or more entropy encoding operations to generate entropy encoded data and output a bitstream that includes the entropy encoded data.

Figure 13:
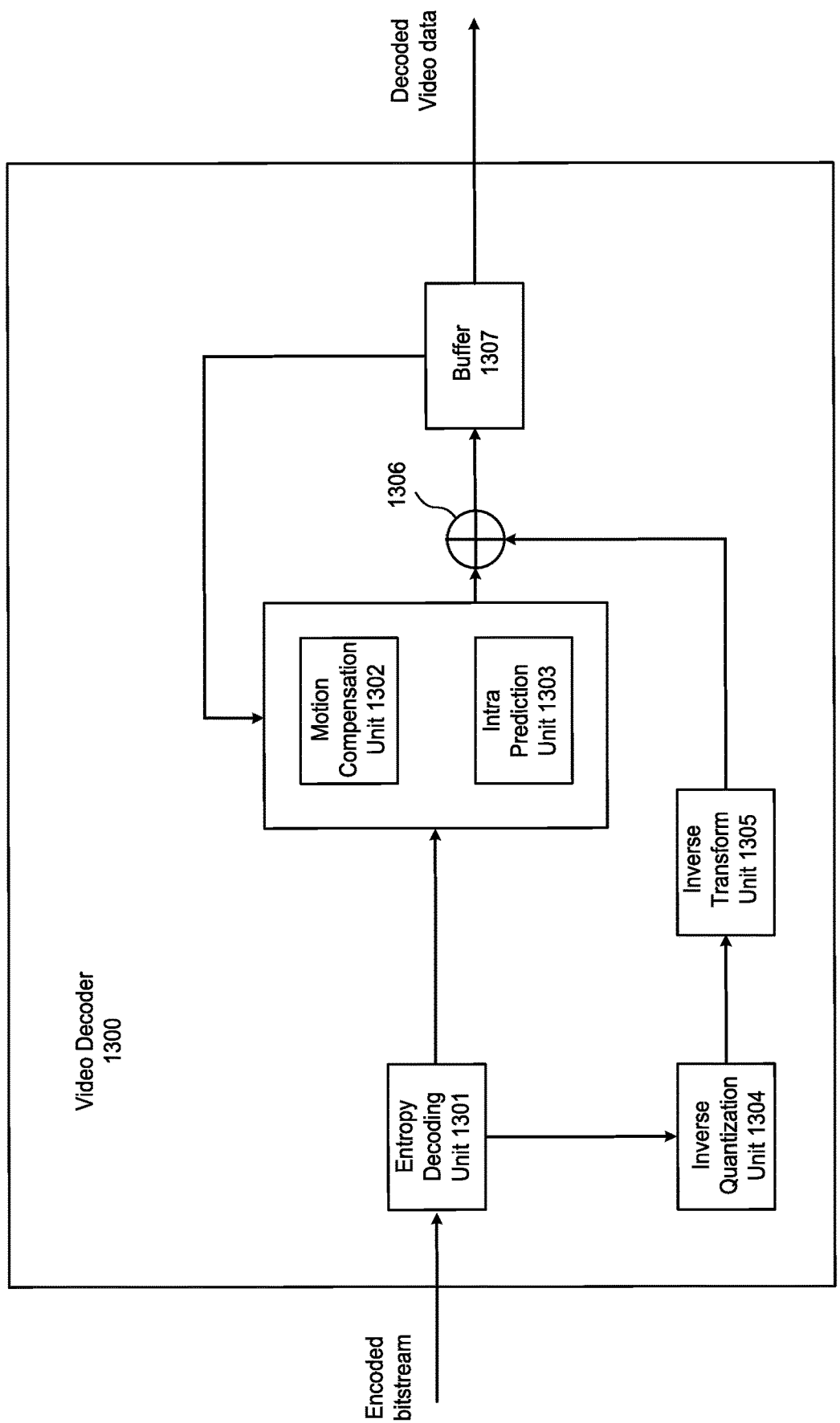
FIG. 13 is a block diagram that illustrates an example decoder.

FIG. 13 is a block diagram illustrating an example of video decoder 1300 which may be video decoder 1124 in the system 1100 illustrated in FIG. 11.

The video decoder 1300 may be configured to perform any or all of the techniques of this disclosure. In the example of FIG. 13, the video decoder 1300 includes a plurality of functional components. The techniques described in this disclosure may be shared among the various components of the video decoder 1300. In some examples, a processor may be configured to perform any or all of the techniques described in this disclosure.

In the example of FIG. 13, video decoder 1300 includes an entropy decoding unit 1301, a motion compensation unit 1302, an intra prediction unit 1303, an inverse quantization unit 1304, an inverse transformation unit 1305, a reconstruction unit 1306, and a buffer 1307. Video decoder 1300 may, in some examples, perform a decoding pass generally reciprocal to the encoding pass described with respect to video encoder 1200 (FIG. 12).

Entropy decoding unit 1301 may retrieve an encoded bitstream. The encoded bitstream may include entropy coded video data (e.g., encoded blocks of video data). Entropy decoding unit 1301 may decode the entropy coded video data, and from the entropy decoded video data, motion compensation unit 1302 may determine motion information including motion vectors, motion vector precision, reference picture list indexes, and other motion information. Motion compensation unit 1302 may, for example, determine such information by performing the AMVP and merge mode.

Motion compensation unit 1302 may produce motion compensated blocks, possibly performing interpolation based on interpolation filters. Identifiers for interpolation filters to be used with sub-pixel precision may be included in the syntax elements.

Motion compensation unit 1302 may use interpolation filters as used by video encoder 1200 during encoding of the video block to calculate interpolated values for sub-integer pixels of a reference block. Motion compensation unit 1302 may determine the interpolation filters used by video encoder 1200 according to received syntax information and use the interpolation filters to produce predictive blocks.

Motion compensation unit 1302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 1303 may use intra prediction modes for example received in the bitstream to form a prediction block from spatially adjacent blocks. Inverse quantization unit 1304 inverse quantizes, i.e., de-quantizes, the quantized video block coefficients provided in the bitstream and decoded by entropy decoding unit 1301. Inverse transform unit 1305 applies an inverse transform.

Reconstruction unit 1306 may sum the residual blocks with the corresponding prediction blocks generated by motion compensation unit 1302 or intra prediction unit 1303 to form decoded blocks. If desired, a deblocking filter may also be applied to filter the decoded blocks in order to remove blockiness artifacts. The decoded video blocks are then stored in buffer 1307, which provides reference blocks for subsequent motion compensation/intra prediction and also produces decoded video for presentation on a display device.

Figure 14:
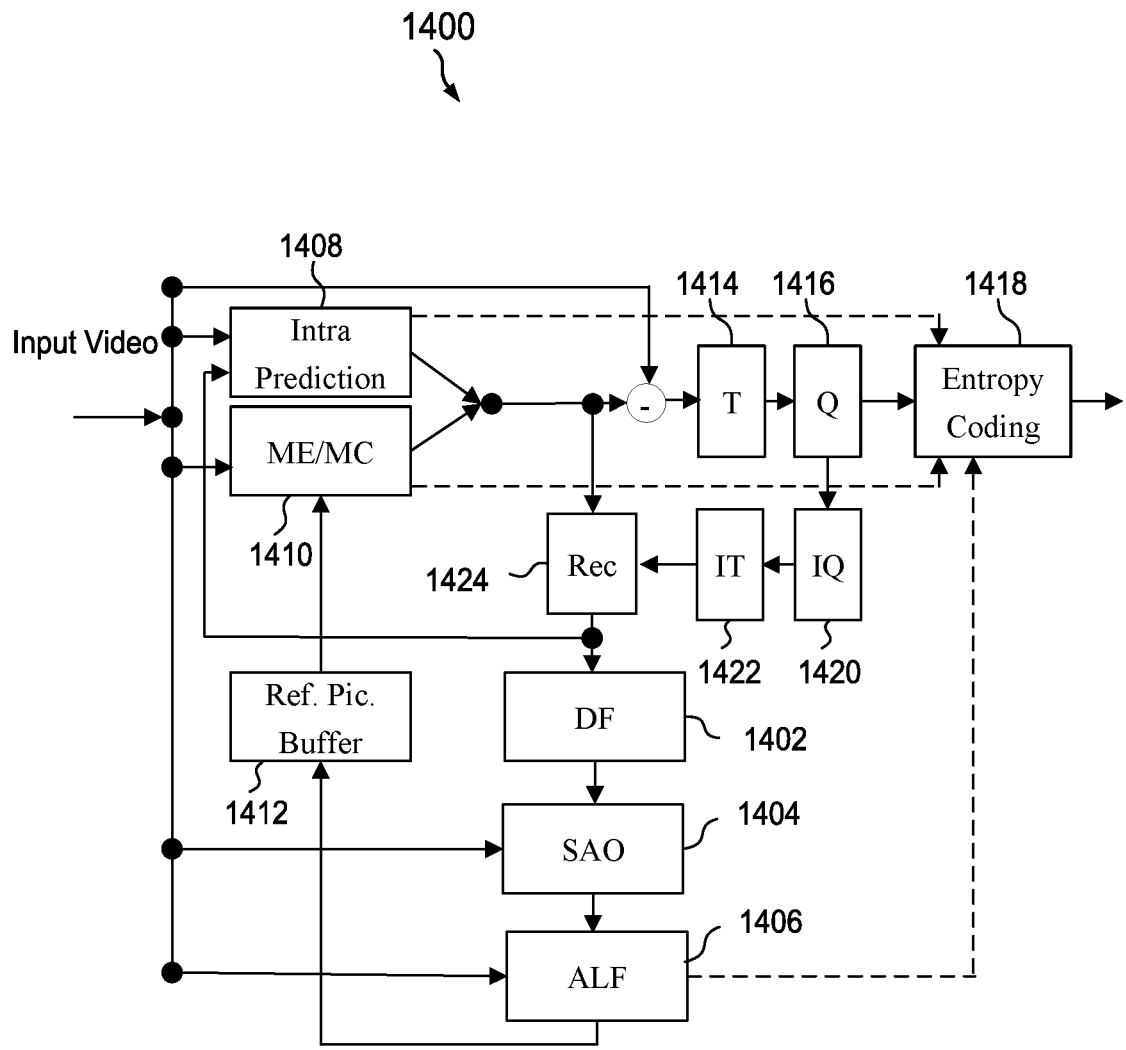
FIG. 14 is a schematic diagram of an example encoder.

FIG. 14 is a schematic diagram of an example encoder 1400. The encoder 1400 is suitable for implementing the techniques of VVC. The encoder 1400 includes three in-loop filters, namely a deblocking filter (DF) 1402, a sample adaptive offset (SAO) 1404, and an adaptive loop filter (ALF) 1406. Unlike the DF 1402, which uses predefined filters, the SAO 1404 and the ALF 1406 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 1406 is located at the last processing stage of each picture and can be regarded as a tool trying to catch and fix artifacts created by the previous stages.

The encoder 1400 further includes an intra prediction component 1408 and a motion estimation/compensation (ME/MC) component 1410 configured to receive input video. The intra prediction component 1408 is configured to perform intra prediction, while the ME/MC component 1410 is configured to utilize reference pictures obtained from a reference picture buffer 1412 to perform inter prediction. Residual blocks from inter prediction or intra prediction are fed into a transform (T) component 1414 and a quantization (Q) component 1416 to generate quantized residual transform coefficients, which are fed into an entropy coding component 1418. The entropy coding component 1418 entropy codes the prediction results and the quantized transform coefficients and transmits the same toward a video decoder (not shown). Quantization components output from the Q component 1416 may be fed into an inverse quantization (IQ) components 1420, an inverse transform (IT) component 1422, and a reconstruction (REC) component 1424. The REC component 1424 is able to output images to the DF 1402, the SAO 1404, and the ALF 1406 for filtering prior to those images being stored in the reference picture buffer 1412.

A listing of solutions preferred by some examples is provided next.

The following solutions show examples of techniques discussed herein.

1. A visual media processing method (e.g., method 1000 depicted in FIG. 10), comprising determining, for a conversion between a video unit of a video and a bitstream of the video, whether a cross-component coding tool is enabled for the conversion based on a rule, and performing the conversion according to the determining, wherein the rule specifies that use of the cross-component coding tool is responsive to (1) whether a separate tree coding structure is used for splitting the video unit, or (2) dimensions of the video unit and whether an extended quadtree partitioning (EQT) is used for splitting the video unit.

2. The method of solution 1, wherein the rule specifies that the cross-component coding tool is disabled responsive to use of the separate tree coding.

3. The method of solution 1, wherein the rule specifies that the cross-component coding tool is disabled responsive to the dimensions of the video unit satisfying certain conditions and use of the EQT.

4. The method of solution 1, wherein the rule specifies that the cross-component coding tool is disabled responsive to the dimensions of the video unit satisfying certain conditions and use of the EQT or a binary tree (BT) or a quadtree (QT) partitioning such that at least one luma sample is coded with a specific coding mode.

5. The method of solution 1, wherein the rule specifies that the cross-component coding tool is disabled for a chroma block responsive to the separate tree coding being used and a luma block in a first separate region is coded with a specific coding mode, wherein the chroma block is in the first separate region.

6. A method of video processing, comprising: performing a conversion between a video unit of a video and a bitstream of the video according to a rule, wherein the rule specifies that a codeword indicating whether the cross-component coding tool is used is selectively included in the bitstream based upon (1) whether a separate tree coding structure is used for splitting the video unit, or (2) dimensions of the video unit and whether an extended quadtree partitioning (EQT) is used for splitting the video unit.

7. The method of solution 1, wherein the rule specifies that the codeword is not included in the bitstream in case that the separate coding tree is used for coding the video unit.

8. The method of solution 1, wherein the rule specifies that the codeword is not included in the bitstream responsive to a dimension of a luma block of the video unit satisfies a coding condition and the luma block contains a sample coded using a particular coding mode.

9. The method of solution 1, wherein the rule specifies that the codeword is not included in the bitstream responsive to the separate tree coding being used for coding the video unit and a luma block in a separate tree region is coded using a particular coding mode.

10. The method of solutions 8-9, wherein the particular coding mode is a non-intra-coding mode.

11. The method of any of solutions 1-10, wherein the rule further is based on a coding information of the video unit.

12. The method of solution 11, wherein the coding information corresponds to a slice type or a picture type.

13. The method of solution 11, wherein use of the rule is indicated in a sequence parameter set or a sequence header or a picture parameter set or a picture header or a slice header or a coding tree unit or a coding unit.

14. The method of solution 11, wherein the coding information includes a color format of the video, a profile or a level of the bitstream.

15. The method of any of above solutions wherein the conversion comprises generating the bitstream from the video unit or generating the video unit from the bitstream.

16. A video decoding apparatus comprising a processor configured to implement a method recited in one or more of solutions 1 to 15.

17. A video encoding apparatus comprising a processor configured to implement a method recited in one or more of solutions 1 to 15.

18. A computer program product having computer code stored thereon, the code, when executed by a processor, causes the processor to implement a method recited in any of solutions 1 to 15.

19. A computer readable medium on which a bitstream complying to a bitstream format that is generated according to any of solutions 1 to 15.

20. A method comprising generating a bitstream according to a method recited in any of solutions 1 to 15 and writing the bitstream to a computer readable medium.

21. A method, an apparatus, a bitstream generated according to a disclosed method or a system described in the present document.

In the above-listed solution, a video unit may be as described in the previous section.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data, comprising:
   for a conversion between a video unit of a video and a bitstream of the video, making a determination of whether to apply a cross-component coding tool for the video unit of the video; and
   performing the conversion according to the determination;
   wherein the cross-component coding tool is disabled for the video unit when a dimension of a first luma block of the video unit satisfies one or more conditions and the first luma block is split using at least one EQT;
   wherein the one or more conditions comprise:
   the dimension of at least one child block or subblock in the first luma block is equal to W*H where W=4 or H=4, and/or at least one partitioning is applied;
   the dimension of the first luma block of the video unit is equal to W*H where W=8 or H=16, and/or horizontal EQT is applied;
   the dimension of the first luma block of the video unit is equal to W*H where W=16 or H=8, and/or vertical EQT is applied;
   the dimension of the first luma block of the video unit is equal to W*H where W=8, and/or quad tree (QT) is applied;
   the dimension of the first luma block of the video unit is equal to W*H where W=8, and/or vertical binary tree (BT) is applied;
   the dimension of the first luma block of the video unit is equal to W*H where H=8, and/or horizontal BT is applied;
   the dimension of the first luma block of the video unit is equal to 32×16, and/or horizontal EQT is applied; or
   the dimension of the first luma block of the video unit is equal to 16×32, and/or vertical EQT is applied;
   wherein the dimension being equal to W*H represents that a width is equal to W and/or a height is equal to H.

2. The method of claim 1, wherein the determination follows a first rule, and the first rule depends on usage of one or more of a separate tree coding, an extended quad tree (EQT), or block dimension.

3. The method of claim 1, wherein the cross-component coding tool is two-step cross-component prediction mode (TSCPM), left TSCPM (TSCPM-Left), above TSCPM (TSCPM-Above), or prediction with multiple cross-components (PMC).

4. The method of claim 1, wherein the cross-component coding tool is disabled for the video unit when a separate tree coding is used for the video unit.

5. The method of claim 1, wherein the cross-component coding tool is disabled for the video unit when a dimension of a second luma block of the video unit satisfies one or more conditions and the second luma block is split using at least one of quad tree (QT), binary tree (BT), or EQT, and the second luma block contains at least one luma sample coded with a specified mode;
   wherein the one or more conditions comprise:
   the dimension of any child block or subblock in the second luma block is equal to W*H where W=4 or H=4, and/or at least one partitioning is applied, and/or the video unit contains at least one luma sample coded with the specified mode;
   the dimension of the second luma block of the video unit is equal to W*H where W=8 or H=16, and/or horizontal EQT is applied, and/or the video unit contains at least one luma sample coded with the specified mode;
   the dimension of the second luma block of the video unit is equal to W*H where W=16 or H=8, and/or vertical EQT is applied, and/or the video unit contains at least one luma sample coded with the specified mode;

the dimension of the second luma block of the video unit is equal to W*H where W=8, and/or the QT is applied, and/or the video unit contains at least one luma sample coded with the specified mode;

the dimension of the second luma block of the video unit is equal to W*H where W=8, and/or vertical BT is applied, and/or the video unit contains at least one luma sample coded with the specified mode;

the dimension of the second luma block of the video unit is equal to W*H where H=8, and/or horizontal BT is applied, and/or the video unit contains at least one luma sample coded with the specified mode;

the dimension of the second luma block of the video unit is equal to 32×16, and/or horizontal EQT is applied, and/or the video unit contains at least one luma sample coded with the specified mode; or the dimension of the second luma block of the video unit is equal to 16×32, and/or vertical EQT is applied, and/or the video unit contains at least one luma sample coded with the specified mode;

wherein the specified mode is at least one selecting from a group consisting of: mode excluding intra-coding mode, inter-coding mode, intra block copy (IBC) mode, string copy mode, intra sub-partitioning (ISP) mode, mode including inter, mode including IBC, mode including string copy, mode including ISP mode, or mode including combinations of inter, IBC, string copy, or ISP mode.

6. The method of claim 1, wherein, in a case where a separate tree coding is used and at least one luma block in a first separate tree region is coded with a specified mode, the cross-component coding tool is disabled for a first chroma block which is in the first separate tree region;

wherein the specified mode is at least one selecting from a group consisting of: mode excluding intra-coding mode, inter-coding mode, intra block copy (IBC) mode, string copy mode, intra sub-partitioning (ISP) mode, mode including inter, mode including IBC, mode including string copy, mode including ISP mode, or mode including combinations of inter, IBC, string copy, or ISP mode.

7. The method of claim 1, wherein the method is applied to a first cross-component coding tool but is not applied to a second cross-component coding tool;

the first cross-component coding tool and the second cross-component coding tool are different from each other and selected from a group consisting of: two-step cross-component prediction mode (TSCPM), left TSCPM (TSCPM-Left), above TSCPM (TSCPM-Above), and/or prediction with multiple cross-components (PMC).

8. The method of claim 1, wherein whether to present at least one syntax element to indicate the cross-component coding tool follows a second rule, and the second rule depends on usage of one or more of a separate tree coding, EQT, or block dimension.

9. The method of claim 8, wherein, in a case where the separate tree coding is used for the video unit, the syntax element that indicates the cross-component coding tool is removed or excluded from the bitstream.

10. The method of claim 8, wherein the syntax element indicating the cross-component coding tool is excluded from the bitstream when a dimension of a third luma block of the video unit satisfies one or more conditions;

wherein the one or more conditions comprise:

the third luma block is split using at least one EQT;

the dimension of any child block or subblock in the third luma block is equal to W*H where W=4 or H=4, and/or at least one partitioning is applied;

the dimension of the third luma block of the video unit is equal to W*H where W=16|H=8, and/or vertical EQT is applied;

the dimension of the third luma block of the video unit is equal to W*H where H=16||W=8, and/or horizontal EQT is applied;

the dimension of the third luma block of the video unit is equal to W*H where W=8, and/or quad tree (QT) is applied;

the dimension of the third luma block of the video unit is equal to W*H where W=8, and/or vertical binary tree (BT) is applied; or the dimension of the third luma block of the video unit is equal to W*H where H=8, and/or horizontal BT is applied;

wherein the dimension being equal to W*H represents that a width is equal to W and/or a height is equal to H.

11. The method of claim 8, wherein the syntax element indicating the cross-component coding tool is excluded from the bitstream when a dimension of a fourth luma block of the video unit satisfies one or more conditions and the fourth luma block is split using at least one of quad tree (QT), binary tree (BT), or EQT, and the fourth luma block contains at least one luma sample coded with a specified mode;

wherein the one or more conditions comprise:

the dimension of any child block or subblock in the fourth luma block is equal to W*H where W=4 or H=4, and/or at least one partitioning is applied;

the dimension of the fourth luma block of the video unit is equal to W*H where W=16||H=8, and/or vertical EQT is applied, and/or the video unit contains at least one luma sample coded with the specified mode;

the dimension of the fourth luma block of the video unit is equal to W*H where H=16||W=8, and/or horizontal EQT is applied, and/or the video unit contains at least one luma sample coded with the specified mode;

the dimension of the fourth luma block of the video unit is equal to W*H where W=8, and/or the QT is applied, and/or the video unit contains at least one luma sample coded with the specified mode;

the dimension of the fourth luma block of the video unit is equal to W*H where W=8, and/or vertical BT is applied, and/or the video unit contains at least one luma sample coded with the specified mode; or the dimension of the fourth luma block of the video unit is equal to W*H where H=8, and/or horizontal BT is applied, and/or the video unit contains at least one luma sample coded with the specified mode;

wherein the specified mode is at least one selecting from a group consisting of: mode excluding intra-coding mode, inter-coding mode, intra block copy (IBC) mode, string copy mode, intra sub-partitioning (ISP) mode, mode including inter, mode including IBC, mode including string copy, mode including ISP mode, or mode including combinations of inter, IBC, string copy, or ISP mode.

12. The method of claim 8, wherein, in a case where the separate tree coding is used and at least one luma block in a first separate tree region is coded with a specified mode, the syntax element that indicates the cross-component coding tool is removed or excluded for a first chroma block which is in the first separate tree region;

wherein the specified mode is at least one selecting from a group consisting of: mode excluding intra-coding mode, inter-coding mode, intra block copy (IBC) mode, string copy mode, intra sub-partitioning (ISP) mode, mode including inter, mode including IBC, mode including string copy, mode including ISP mode, or mode including combinations of inter, IBC, string copy, or ISP mode.

13. The method of claim 8, wherein when the syntax element indicating the cross-component coding tool is excluded, usage of the cross-component coding tool is inferred to be disabled.

14. The method of claim 1, wherein whether to and/or how to apply the method depends on at least one selected from a group consisting of: coding information, information signaled from an encoder to a decoder, color format, standard level, or profiles.

15. The method of claim 1, wherein the conversion comprises encoding the video into the bitstream.

16. The method of claim 1, wherein the conversion comprises decoding the bitstream to generate the video.

17. An apparatus for processing video data comprising a processor and a non-transitory memory with instructions thereon, wherein the instructions upon execution by the processor, cause the processor to:
for a conversion between a video unit of a video and a bitstream of the video, make a determination of whether to apply a cross-component coding tool for the video unit of the video; and
perform the conversion according to the determination;
wherein the cross-component coding tool is disabled for the video unit when a dimension of a first luma block of the video unit satisfies one or more conditions and the first luma block is split using at least one EQT;
wherein the one or more conditions comprise:
the dimension of at least one child block or subblock in the first luma block is equal to W*H where W=4 or H=4, and/or at least one partitioning is applied;
the dimension of the first luma block of the video unit is equal to W*H where W=8 or H=16, and/or horizontal EQT is applied;
the dimension of the first luma block of the video unit is equal to W*H where W=16 or H=8, and/or vertical EQT is applied;
the dimension of the first luma block of the video unit is equal to W*H where W=8, and/or quad tree (QT) is applied;
the dimension of the first luma block of the video unit is equal to W*H where W=8, and/or vertical binary tree (BT) is applied;
the dimension of the first luma block of the video unit is equal to W*H where H=8, and/or horizontal BT is applied;
the dimension of the first luma block of the video unit is equal to 32×16, and/or horizontal EQT is applied; or
the dimension of the first luma block of the video unit is equal to 16×32, and/or vertical EQT is applied;
wherein the dimension being equal to W*H represents that a width is equal to W and/or a height is equal to H.

18. The apparatus of claim 17, wherein the determination follows a first rule, and the first rule depends on usage of one or more of a separate tree coding, an extended quad tree (EQT), or block dimension.

19. A non-transitory computer-readable recording medium storing a bitstream of a video which is generated by a method performed by a video processing apparatus, wherein the method comprises:
making a determination of whether to apply a cross-component coding tool for a video unit of the video; and
generating the bitstream of the video according to the determination;
wherein the cross-component coding tool is disabled for the video unit when a dimension of a first luma block of the video unit satisfies one or more conditions and the first luma block is split using at least one EQT:
wherein the one or more conditions comprise:
the dimension of at least one child block or subblock in the first luma block is equal to W*H where W=4 or H=4, and/or at least one partitioning is applied;
the dimension of the first luma block of the video unit is equal to W*H where W=8 or H=16, and/or horizontal EQT is applied;
the dimension of the first luma block of the video unit is equal to W*H where W=16 or H=8, and/or vertical EQT is applied;
the dimension of the first luma block of the video unit is equal to W*H where W=8, and/or quad tree (QT) is applied;
the dimension of the first luma block of the video unit is equal to W*H where W=8, and/or vertical binary tree (BT) is applied;
the dimension of the first luma block of the video unit is equal to W*H where H=8, and/or horizontal BT is applied;
the dimension of the first luma block of the video unit is equal to 32×16, and/or horizontal EQT is applied; or
the dimension of the first luma block of the video unit is equal to 16×32, and/or vertical EQT is applied;
wherein the dimension is equal to W*H represents that a width is equal to W and/or a height is equal to H.

* * * * *